US008180763B2

(12) United States Patent
Freedman et al.

(10) Patent No.: US 8,180,763 B2
(45) Date of Patent: May 15, 2012

(54) CACHE-FRIENDLY B-TREE ACCELERATOR

(75) Inventors: Craig Freedman, Sammamish, WA (US); Cristian Diaconu, Kirkland, WA (US); Michael Zwilling, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 12/474,278

(22) Filed: May 29, 2009

(65) Prior Publication Data

US 2010/0306222 A1    Dec. 2, 2010

(51) Int. Cl.
 *G06F 17/30* (2006.01)
(52) U.S. Cl. .................................. 707/713; 707/736
(58) Field of Classification Search .................. 707/713, 707/736
See application file for complete search history.

(56) References Cited

U.S. PATENT DOCUMENTS

| 5,204,958 A | 4/1993 | Cheng et al. |
| 5,283,894 A | 2/1994 | Deran |
| 5,644,763 A | 7/1997 | Roy |

OTHER PUBLICATIONS

Chen, et al. "Fractal Prefetching B+Trees: Optimizing Both Cache and Disk Performance", Retrieved at<<http://www.pdl.cmu.edu/ftp/Database/fpbtree.pdf>>, ACM SIGMOD Jun. 4-6, 2002, Madison, Wisconsin, USA, pp. 12.

Agarwal, et al. "Cache-Oblivious Data Structures for Orthogonal Range Searching", Retrieved at<<http://www.daimi.au.dk/~large/Papers/cachesocg03.pdf>>, SoCG'03, Jun. 8-10, 2003, San Diego, California, USA, pp. 9.
Graefe Goetz, "B-tree Indexes, Interpolation Search, and Skew", Retrieved at<<http://www.cs.cmu.edu/~damon2006/pdf/graefe06btreeindexes.pdf>>, Proceedings of the Second International Workshop on Data Management on New Hardware (DaMoN 2006), Jun. 25, 2006, Chicago, Illinois, USA., Copyright 2006 ACM, pp. 10.
Nori, et al. "Microsoft Project Code Named "Velocity" ", Retrieved at<<http://msdn.microsoft.com/en-us/library/cc645013(printer).aspx>>, Jun. 2008, pp. 14.
Brodal, et al."Cache Oblivious Search Trees via Binary Trees of Small Height ", Retrieved at<<http://www.brics.dk/RS/01/36/BRICS-RS-01-36.pdf>>, Oct. 2001, pp. 23.
Shao, et al. "Clotho: Decoupling Page Layout from Storage Organization", Retrieved at<<http://www.pdl.cmu.edu/PDL-FTP/Database/clotho_vldb04_abs.html>>, Proceedings of the 30th VLDB Conference. Toronto, Canada, Aug. 29-Sep. 3, 2004, p. 1.

(Continued)

*Primary Examiner* — Son T Hoang
(74) *Attorney, Agent, or Firm* — Gary Mager

(57) ABSTRACT

A system and method for accelerating searches of B-trees. An auxiliary index that is optimized for use with a cache is used in conjunction with a B-tree. A hash type of auxiliary index maintains pointers to key entries in the B-tree leaf nodes. The hash type of index may be searched, and a resulting pointer is used to locate records of the B-tree, bypassing a search of the B-tree. A top level type of auxiliary index maintains pointers to leaf nodes or internal nodes of the B-tree. A top level index may be searched, and a search of the B-tree is performed beginning with the node found by using the top level index. A monitoring mechanism may automatically start, change, or discard the auxiliary index based on an amount of cache memory, types of searches, or other factors. The auxiliary index may be optimized for high performance in read only searches, while the B-tree provides transaction durability.

18 Claims, 10 Drawing Sheets

OTHER PUBLICATIONS

Bayer, et al."Prefix B-trees", Retrieved at<<http://delivery.acm.org/10.1145/330000/320530/p11-bayer.pdf?key1=320530&key2=2003848321&coll=GUIDE&dl=GUIDE&CFID=29013684&CFTOKEN=52956683>>, ACM, Mar. 1977, pp. 16.

Bender, et al."Concurrent Cache-Oblivious B-trees", Retrieved at<<http://delivery.acm.org/10.1145/1080000/1074009/p228-bender.pdf?key1=1074009&key2=4313848321&coll=GUIDE&dl=GUIDE&CFID=29014123&CFTOKEN=11272812>>, SPAA'05, Jul. 18-20, 2005, Las Vegas, Nevada, USA, pp. 228-237.

Kasheff Zardosht, "Cache-Oblivious Dynamic Search Trees", Retrieved at<<http://bradley.csail.mit.edu/~bradley/papers/Kasheff04.pdf>>, Jun. 2004, pp. 60.

Lehman, et al."A Study of Index Structures for Main Memory Database Management Systems", Retrieved at<<http://www.cs.duke.edu/courses/spring03/cps216/papers/lehman-carey-1986.pdf>>, Kyoto, Aug. 1986, pp. 294-303.

"Oracle TimesTen Products and Technologies", Retrieved at<<http://www.oracle.com/technology/products/timesten/pdf/wp/wp_timesten_tech.pdf>>, Feb. 2007, pp. 27.

Scherer, et. al."MIME-Compatible Unicode Compression", Unicode Technical Note #6, Retrieved at <<http://unicode.org/notes/tn6/>>, Feb. 4, 2006, pp. 8.

CACHE-FRIENDLY B-TREE ACCELERATOR

BACKGROUND

In database and other data storage systems, efficiency of accessing, retrieving, and updating data is an important feature. A database generally has a set of records stored on a computer storage device and a data access system, such as a database management system (DBMS) that includes program code and data. Generally, requests to access, retrieve, or update the data are received and processed by the data access system.

A data access system typically includes an index that enables the system to locate one or more data records. One type of index is called a B-tree. A B-tree is a tree data structure that maintains data in a sorted order, and allows searches, insertions, and deletions. In a B-tree, each node of the tree, other than leaf nodes, can have a variable number of keys and child nodes. Insertions or deletions of keys may result in changing the number of keys in one or more nodes, splitting nodes, or merging nodes. A B-tree typically has a root node, internal nodes, and leaf nodes; though a small B-tree may have no internal nodes. Typically, all leaf nodes of a B-tree are at the same depth. In a B-tree of order N, each node has at most N child nodes, and each internal node has one more key than the number of child nodes. Some B-trees may have data records, or pointers to data records, in nodes at any level of the tree. A B+ tree is a B-tree that keeps data records, or pointers to data records, only at leaf nodes.

Modern computer processors typically have one or more levels of cache memory, referred to herein simply as "cache." A cache is a faster and smaller memory component as compared with a computer's main memory. A processor may bring small amounts of data or program instructions from the main memory into a cache, and process the data or instructions from the cache, thereby reducing access times. When the processor needs to access data from memory, it may first check whether the data has already been placed into the cache. If it has, it can access the data from the cache, without needing to take the time to access it from main memory. If not, it retrieves the data from main memory. Depending on the logic and configuration of the processor and cache, it may store the retrieved data into the cache, where it will be available for a subsequent access.

Some processors have two or three levels of cache. A level 1 (L1) cache is the smallest and fastest cache; an L2 is larger and somewhat slower cache; an L3 is still larger and slower. However, even an L3 cache is typically much faster than main memory. In some configurations, each level of cache is about an order of magnitude faster than the next level.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to accelerate searches of B-trees. In one embodiment, an auxiliary index that is optimized for use with a cache is employed in conjunction with a B-tree. The auxiliary index may have key values and corresponding pointers to internal nodes or leaf nodes of the B-tree. A search in an example method includes receiving a search key and employing the search key to search the auxiliary index, in order to locate an aux entry having an aux key matching the search key and a corresponding page identifier. If a matching key is found, a process may determine whether the corresponding page identifier is trusted. If it is trusted, it may be used to locate an internal node or leaf node and retrieve a data record corresponding to the search key.

In one embodiment, if the page identifier is not trusted, a search of the B-tree may be performed to retrieve the data record corresponding to the search key. In one embodiment, the aux entry may be updated or deleted based on the results of the B-tree search.

In an example embodiment, a hash table of auxiliary index maintains pointers to entries in the leaf nodes of the B-tree. The hash table may be a lazy hash table or a definitive hash table.

In an example embodiment, a top level type of auxiliary index maintains pointers to internal nodes or leaf nodes of the B-tree. A top level type of index may be an order preserving structure, a cache optimized structure, a binary tree structure, or a combination thereof.

In an example embodiment, determining whether a page identifier is trusted may include comparing an LSN from the auxiliary index with a corresponding LSN in the B-tree node. If they do not match, the page identifier is considered distrusted. An ownership of the B-tree node may be checked to determine whether it is owned by the B-tree manager. A page may be owned by the B-tree manager, another process, or have no owner. If the page is not owned by the B-tree manager, the page identifier is considered to be distrusted.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
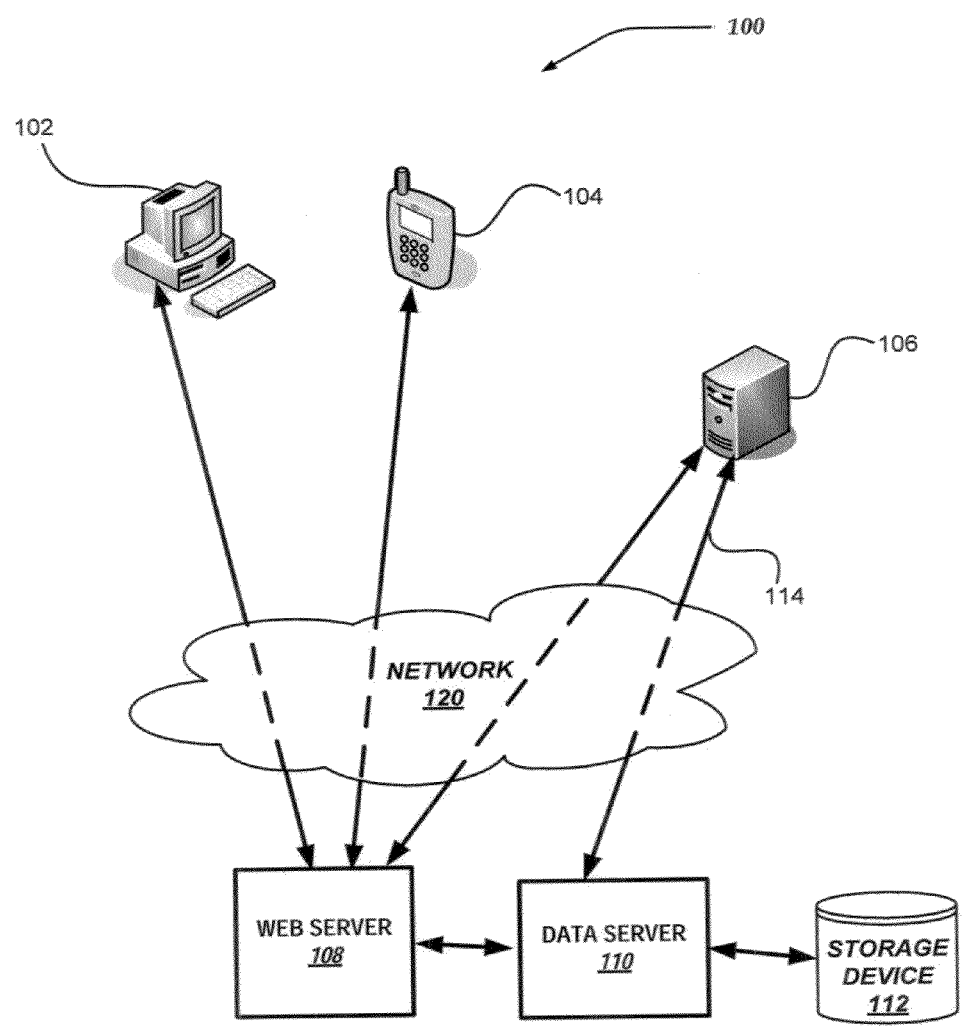
FIG. 1 is a block diagram of an example environment in which embodiments may be practiced.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "pointer" refers to a reference to a target physical or logical memory location, data structure, program instruction, or program segment. A pointer "points to" a target and may be used to locate or obtain the target. A pointer may be implemented in a variety of ways, including an address, an offset, an index, or an identifier. It may be used to identify or locate a node of a graph structure.

As used herein, the terms "latch" and "latching" refer to a mechanism to control access to data. More specifically, latches are used to assure physical consistency of data. This is distinguished from locks, which are used to assure logical consistency of data. A latch may be used, for example, to control access to a physical page of memory. It may be used to prevent two processes from concurrently writing to the same physical page of memory. A lock may be used to ensure transactional consistency of data access. For example a row being modified in the context of one transaction is 'locked' for the duration of the owning transaction; any other transaction attempting to access the same row blocks until the owner transaction concludes processing. While latches are used to ensure physical stability, locks are used to ensure logical stability in the context of a well defined transactional semantic.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of an example environment 100 in which embodiments may be practiced. FIG. 1 provides a basic understanding an example environment, though many configurations may be employed and many details are not illustrated in FIG. 1. As illustrated in FIG. 1, an example environment 100 includes clients 102, 104, and 106. Each of clients 102-106 may be a client computing device, process, or any component that requests access to stored data. In the example embodiment, client 102 is illustrated as a personal computer, client 104 is illustrated as a mobile communication device, and client 106 is illustrated as a server, in order to show the variety of clients that may exist. Other computing devices or processes may be clients in various environments.

Example environment 100 includes Web server 108. Web server 108 may be a computing device, server, or a server farm that includes multiple servers, or a process executing thereon. Web server 108 may receive request from each of clients 102-106, perform actions, and respond to the requests. In various embodiments, Web server 108 may maintain a Web site, an email service, a messaging service, or provide any of various other services.

In the illustrated example environment, Web server 108 communicates with data server 110. Data server 110 may be a computing device, server, or a server farm that includes multiple servers, or a process executing thereon. Data server 110 may have an associated storage device 112, in which data is stored. Storage device 112 may include one or more disk drives, flash memory, optical storage mechanisms, or any other type of non-volatile memory. Storage device 112, or a portion thereof, may be external to data server 110 or integrated with it.

Each of clients 102-106 may communicate with Web server 108 through direct connections or a network 120. Network 120 may include a local area network, a wide area network, or a combination thereof. In one embodiment, network 120 includes the Internet, which is a network of networks. Network 120 may include wired communication mechanisms, wireless communication mechanisms, or a combination thereof. Communications between clients 102-106 and Web server 108, with each other or other computing devices may employ one or more of various wired or wireless communication protocols, such as IP, TCP/IP, UDP, HTTP, SSL, TLS, FTP, SMTP, WAP, Bluetooth, or WLAN.

As illustrated by arrow 114, any client, such as client 106, may communicate directly with data server 110. This may include sending requests to, and receiving responses from, data server 110. Web server 108 may communicate with data server 110 directly or through a network, such as network 120. Web server 108 may be considered to be a client sending requests to data server 110.

In one example configuration, any one of clients 102-106 may send a request for data to Web server 108. In response, Web server 108 may send a query to data server 110. Data server 110 performs actions to access data, which may be stored on storage device 112. Data server 110 may then send a response to Web server 108, which sends its response, based on the data server's response, to the client. Various other processes may occur in environment 100 or variations thereof. As discussed, client 106 may send a query directly to data server 110. In one configuration, Web server 108 may send a request to data server 110 that is not triggered by a client request. In some configurations, a client may reside on the same device as Web server 108 or even on the same device as data server 110, and send requests to data server 110.

FIG. 1 is only an example of a suitable environment and is not intended to suggest any limitation as to the scope of use or functionality of the present invention. Thus, a variety of system configurations may be employed without departing from the scope or spirit of the present invention. For example, any of the functions of Web server 108 or data server 110 may be combined into one or more computing devices, distributed, or replicated among multiple computing devices in a variety of ways.

In one embodiment, each of clients 102-106, Web server 108, and data server 110 is implemented by one or more computing devices. A computing device may be a special purpose or general purpose computing device. In brief, one embodiment of a computing device that may be employed includes one or more processing units, a memory, a display, keyboard and pointing device, and a communications interface. The one or more processing units may include one or more single or multiple core processors. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device of a development system.

Figure 2:
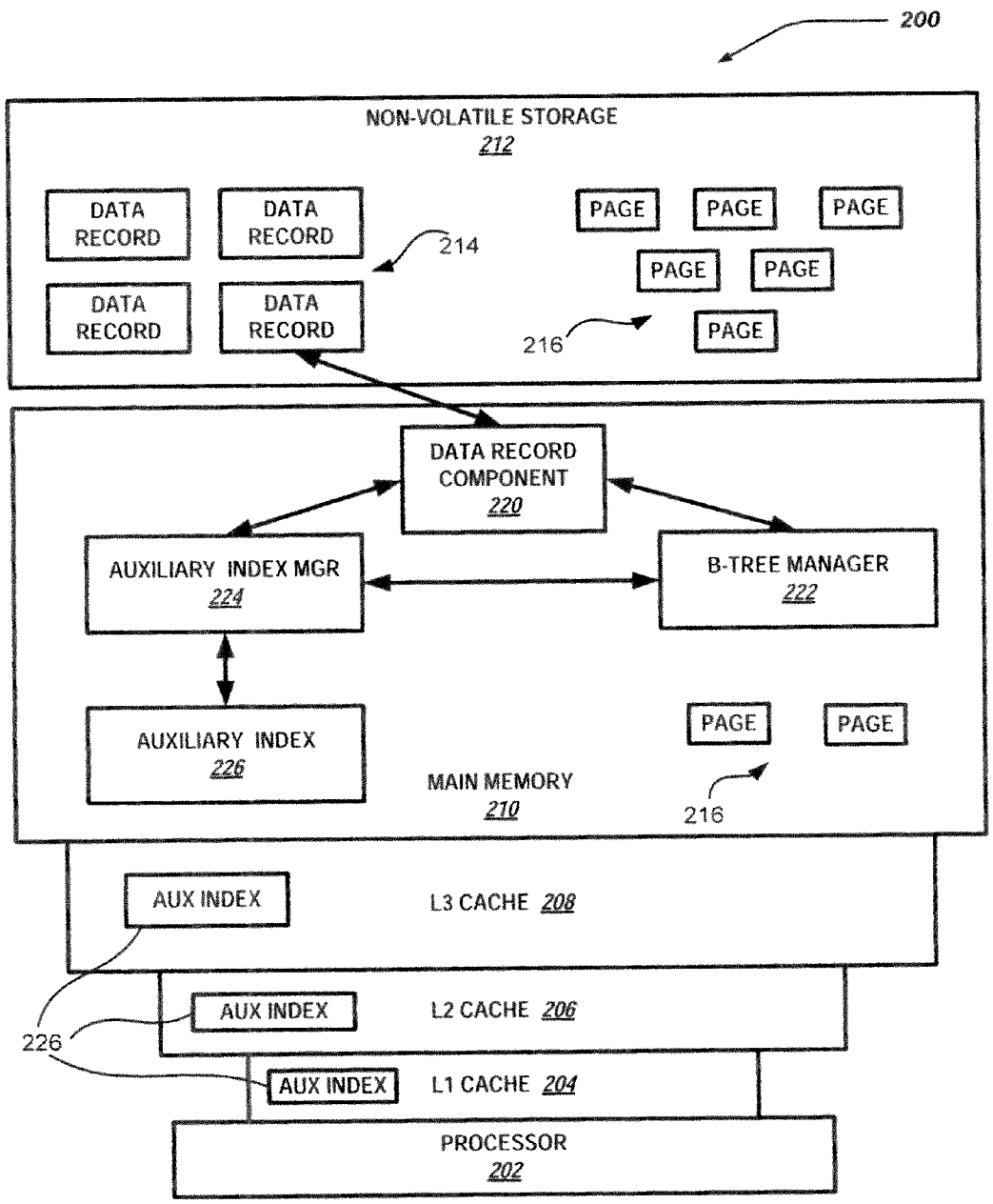
FIG. 2 is a block diagram illustrating an example embodiment of a computing system that may be employed to implement a data server.

FIG. 2 is a block diagram illustrating an example embodiment of a computing system 200 that may be employed to implement data server 110, or portions thereof. In various embodiments, system 200 may be implemented with one or more servers or other computing devices configured in a variety of ways.

As illustrated, computing system 200 includes one or more processors 202, which perform actions to execute instructions of various computer programs. In one configuration, processor 202 may include one or more central processing units, one or more processor cores, one or more ASICs, or other hardware processing components and related program logic. Computing system 200 may also include a network communications unit, which performs actions to send or receive messages or signals to remote devices across a network.

In the illustrated embodiment, computing system 200 includes three levels of cache: L1 cache 204, L2 cache 206, and L3 cache 208. In various configurations, computing system 200 may include more or less than three levels of cache, and may include multiple processors, each with its own associated caches. Though not drawn to scale, FIG. 2 illustrates a configuration in which and L3 cache 208 has a greater storage capacity than L2 cache 206, which in turn has a greater storage capacity than L1 cache 204. In one embodiment, L1 cache 204 has a lower latency than L2 cache 206, which in turn has a lower latency than L3 cache 208. In one implementation, any one or more of L1 cache 204, L2 cache 206, or L3 cache 208 may be implemented by a synchronous dynamic random access memory (SDRAM), though some embodiments may use other technologies.

In the illustrated embodiment, system 200 also includes main memory 210. This may be any type of memory. In some embodiments, main memory 210 is a volatile memory, such as dynamic random access (DRAM) memory. In one embodiment, main memory 210 may be a non-volatile memory, such as flash memory. In some configurations, main memory 210 has a greater storage capacity and a higher latency than L3 cache 208.

The illustrated embodiment of system 200 further includes non-volatile storage 212. This may include one or more disk drives, flash memory, optical storage mechanisms, or any other type of non-volatile memory. In the configuration in which main memory 210 includes non-volatile memory, non-volatile storage 212 may be the same or different component from main memory 210.

In the illustrated configuration, non-volatile storage 212 includes multiple data records 214. A data record 214 may include a single datum, a row or column of data, a table, or any other set of data.

In the illustrated configuration, non-volatile storage 212 also includes multiple pages 216. A page may be the unit of a node in a B-tree structure. Some pages may include a reference to one or more data records 214. Some pages may include one or more data records 214. Pages are discussed in more detail with respect to FIG. 3.

In one embodiment, main memory 210 is used to store one or more program components, or portions thereof, during program execution. This may include data record component 220, B-tree manager 222, or auxiliary index manager 224. In one embodiment, data record component 220 may perform actions relating to retrieving, updating, inserting, or deleting data records 214. B-tree manager 222 may perform actions of traversing a B-tree to locate one or more data records 214. B-tree manager 222 may also perform actions to create, update, maintain, or delete a B-tree. In one embodiment, data record component 220, or a portion thereof, may be integrated with B-tree manager 222.

Auxiliary index manager 224 may perform actions to create, maintain, and access auxiliary index 226. Auxiliary index 226 may be stored within main memory 210. As discussed herein, auxiliary index 226 and auxiliary index manager 224 may be used to accelerate access to data records 214. In one embodiment, auxiliary index manager 224 may communicate with data record component 220 to retrieve data records.

B-tree manager 222 and an associated B-tree form a primary data access system. In some embodiments, the B-tree persists in non-volatile storage 212 and at least portions of it are stored in main memory 210. When changes are made to the B-tree, the changes may be made in main memory 210 and stored in its persistent state in non-volatile storage 212, though the actual storage may not occur immediately. B-tree manager 222 may include various latching or locking techniques to maintain transaction durability and data integrity.

In various embodiments, auxiliary index 226 does not persist to non-volatile storage 212. As shown in the illustrated embodiment of system 200, portions of auxiliary index 226 may reside within L1 cache 204, L2 cache 206, or L3 cache 208, in addition to main memory 210, at least for some time periods. Auxiliary index 226 and associated actions of auxiliary index manager 224 may be designed to maximize the percentage of auxiliary index 226 that is stored within one or more of the caches. Auxiliary index 226 and the actions of auxiliary index manager 224 are discussed in further detail herein.

Auxiliary index manager 224 and auxiliary index 226 may be designed to be optimized for speed of operation. Auxiliary index manager 224 and auxiliary index 226 may be optimized to perform quickly in environments in which most operations are read-only; that is, the operations don't result in changes to the auxiliary index 226 or B-tree. An environment in which at least a majority of operations are read-only is referred to as "read mostly." In one embodiment, the logic of auxiliary index manager 224 may abort an action due to a prior or concurrent update, and revert to a search using the B-tree.

In one embodiment, the use of auxiliary index 226 may vary based on an amount of available cache or an amount of available main memory. In one example embodiment, auxiliary index 226 may substitute for the B-tree in a configuration where there is sufficient cache or main memory; however, if cache or main memory becomes insufficient, auxiliary index 226 may adapt by performing a partial substitution for the B-tree. In one embodiment, if the cache or main memory becomes insufficient to a specified threshold, auxiliary index 226 may be discarded, with searches reverting to B-tree searches. These and other features are discussed in further detail herein.

Figure 3:
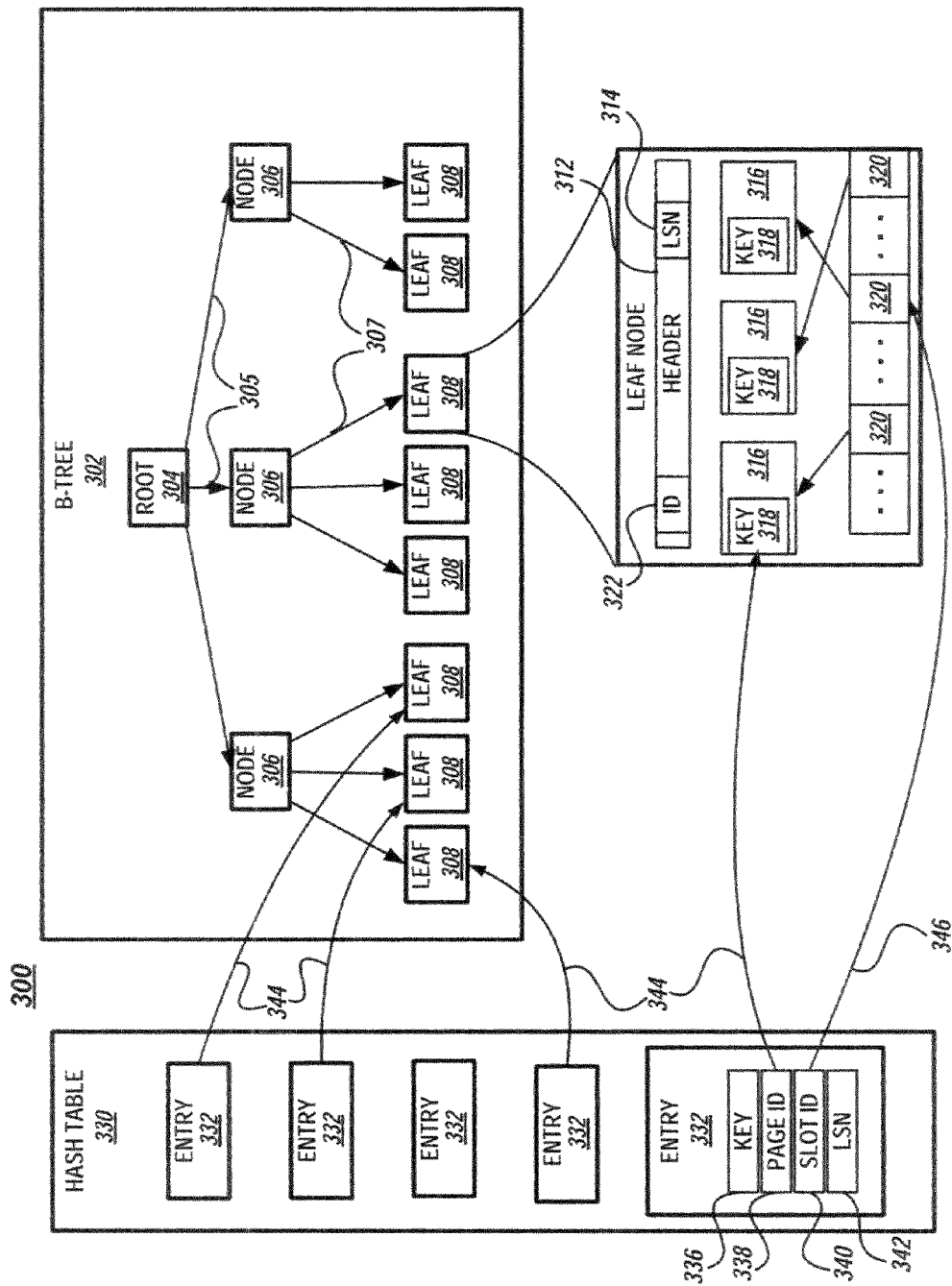
FIG. 3 is a block diagram of an example B-tree accelerator system 300 that may be employed by one or more of the mechanisms herein described.

FIG. 3 is a block diagram of an example B-tree accelerator system 300, including data structures that may be generated and employed by one or more of the mechanisms herein described. As illustrated, system 300 includes example B-tree 302. B-tree 302 is made up of a number of nodes, at multiple levels. In particular, example B-tree 302 has one root node 304, multiple internal nodes 306, and multiple leaf nodes 308. B-tree 302 has many possible variations, and may have fewer nodes or many more nodes. Though only one level of internal nodes 306 is illustrated, B-tree 302 may have multiple levels of internal nodes 306 or no internal nodes. Though example B-tree 302 has at most three leaf nodes for each internal node 306, in various configurations the order of B-tree 302 may be more or less than three. An internal node may have N keys and N+1 pointers to child nodes, where N is less than or equal to the order of the B-tree. In a tree structure, the length of the path from the root node to a particular node is referred to as the "depth" of the node. The set of all nodes at a given depth is referred to as the "level" of the tree. The set of nodes at a given depth are also referred to as "sibling" nodes. The root node is considered the top of the tree and is at level zero. In the illustrated example B-tree 302, the leaf nodes 308 are at the bottom of the tree, at level 2. In one implementation, each node of the B-tree includes a pointer to its right sibling, if it has one, forming a linked list of nodes at each level. These pointers may be used to traverse nodes at any level of the B-tree.

In some implementations, a node of a B-tree occupies a physical page of memory, and is often referred to as a "page." As used herein, the terms "node" and "page" are used interchangeably when referring to a B-tree.

To search a B-tree, such as B-tree 302, a process may begin at the root node 304, and determine an internal node 306 at the next level, based on keys in the root node and corresponding child node pointers. The process may then retrieve the internal node and repeat the process at each level until the desired leaf node is reached. Prior to reading data from, or writing data to the page of each node, the page may be latched. The latch of a page is not released until after the page at the next level is latched. This technique of latching a page and not releasing the latch until the next page is latched is referred to as "crabbing." Crabbing helps to maintain integrity of the B-tree when numerous concurrent processes may be searching or updating the structure. However, continued latching of each node during a traversal increases the time it takes to traverse the B-tree. It may also increase the cost of retrieving pages from a buffer pool or searching pages.

The exploded view of leaf node 308 illustrates, in greater detail, an example embodiment of a leaf node. In the example embodiment, leaf node 308 includes a header 312 and a row of slots 320. A slot includes a pointer to a corresponding data record 316. Each data record 316 includes a key 318. Thus, a slot may be used to locate a corresponding key 318 and record 316. The slots maintain a logical ordering of the corresponding keys 318 and records 316. A process may scan each key sequentially by iterating over each slot in order and using the pointer in each slot to locate the corresponding key. In various embodiments, leaf nodes may be implemented in a variety of ways. For example, in one embodiment, each key is stored together with its corresponding slot in an array of key-slot pairs. In one embodiment, each key is stored outside of the corresponding record in another manner.

In the illustrated embodiment, each leaf node 308 contains a set of data records, referred to herein simply as records 316. In one embodiment, records 316 may be external to the leaf nodes, with each slot 320 containing a pointer to the corresponding record.

In one embodiment, each leaf node header 312 includes a log sequence number (LSN) 314. Each time a leaf node is modified, the corresponding LSN value may be modified. In one embodiment, a new LSN is determined for a leaf node by incrementing a global sequence number, to avoid duplicate LSNs. As discussed in further detail herein, the LSN provides a mechanism for determining whether a node has changed since a prior access to the node. In one embodiment, each node of the B-tree, including the root node and internal nodes 306, have a corresponding LSN.

In one embodiment, each leaf node includes a page ID 322. The page ID may be generated when a node is created, such that it uniquely identifies the node in which it is contained. In one embodiment, a node's page ID remains unchanged during the life of the node. A page ID may be used as a pointer by a process, to locate the node.

Though not illustrated in FIG. 3, in one embodiment, each internal node 306 includes a header 312, page ID 322, LSN 314, and a row of slots, each slot pointing to a corresponding key. The node may have a row of child node pointers, with one more child node pointer than the number of slots. Each slot and corresponding key value serves as a separator of the child nodes when traversing the B-tree.

The illustrated embodiment of system 300 includes an auxiliary index. In the illustrated embodiment, the auxiliary index is a hash table 330, though other embodiments use other types of data structures. In general, a hash table uses a hash function to map keys to corresponding entries 332. In the illustrated embodiment of system 300, hash table 330 maps keys to pages and slots. Hash table 330 may be implemented in a variety of ways, and the mechanisms described herein are not limited to any particular implementation.

To avoid confusion, components of the auxiliary index may be preceded by "aux," and components of B-tree 302 may be preceded by "BT." For example, an aux page ID may point to a BT leaf node 308, such that a corresponding aux key matches a BT key in the BT leaf node. Additionally, the terms "key," "LSN," "page ID" and other field names may refer to a data field or the value stored in the data field, the specific reference being clear from the context.

An exploded view of aux entry 332 illustrates, in greater detail, an example embodiment of an entry. In the example embodiment, entry 332 includes an aux key 336, an aux page ID 338, an aux slot ID 340, and an aux LSN 342. The aux page ID 338 may serve as a pointer to a B-tree leaf node 308, as represented by arrows 344. The aux key 336 may correspond to a BT key 318 in a BT leaf node. The aux key value may be normalized to account for case sensitivity, collation, or other issues. The aux slot ID 340 may serve as a pointer to a BT slot 320, as represented by arrow 346. The aux LSN 342 may correspond to a BT LSN 314 in the header of a BT leaf node. In some embodiments, the aux slot ID 340 may be implemented as an offset or an array index. An insertion or deletion of a slot entry in a BT page may therefore invalidate an aux slot ID pointing to a slot in the BT page.

Though not illustrated in FIG. 3, in one embodiment, aux entry 332 includes an aux data record that contains a copy of at least a portion of the B-tree record 316 corresponding to the aux key. In one implementation, an aux data record stores the most commonly used columns of the corresponding B-tree record 316. As discussed herein, in this configuration, a search for a record may be performed without having to retrieve the data record from the B-tree leaf node 308.

In one embodiment, a particular record 316 may be found based on a specified search key value in the following manner. The B-tree 302 may be traversed, beginning at root node 304, to an internal node at each level, until a leaf node 308 is reached. At each level, the node at the next level may be found by comparing the search key with key values in the current node, and determining the child node that represents a key range that includes the search key. When a leaf node 308 is reached, it is known that, if there is a record corresponding to the search key, there is a key 318 in the leaf node that matches the search key. A search within the leaf node 308 is performed, using a sequential search, binary search, or other type of search, to determine the matching key 318. If it is found, the corresponding slot 320 is used to locate the corresponding record 316. The data of record 316 may then be retrieved.

In one embodiment, the particular record 316 may be found based on the search key value by using hash table 330, in the following manner. The hash table 330 is searched, using hash table mechanisms, to locate an entry 332 having an aux key 336 matching the search key. The aux page ID 338 in the same entry 332 may be used to locate the corresponding BT leaf node 308. If it is found, the aux slot ID 340 may be used to locate the corresponding slot 320, which points to the corresponding record 316. The data of record 316 may then be retrieved.

Figure 4:
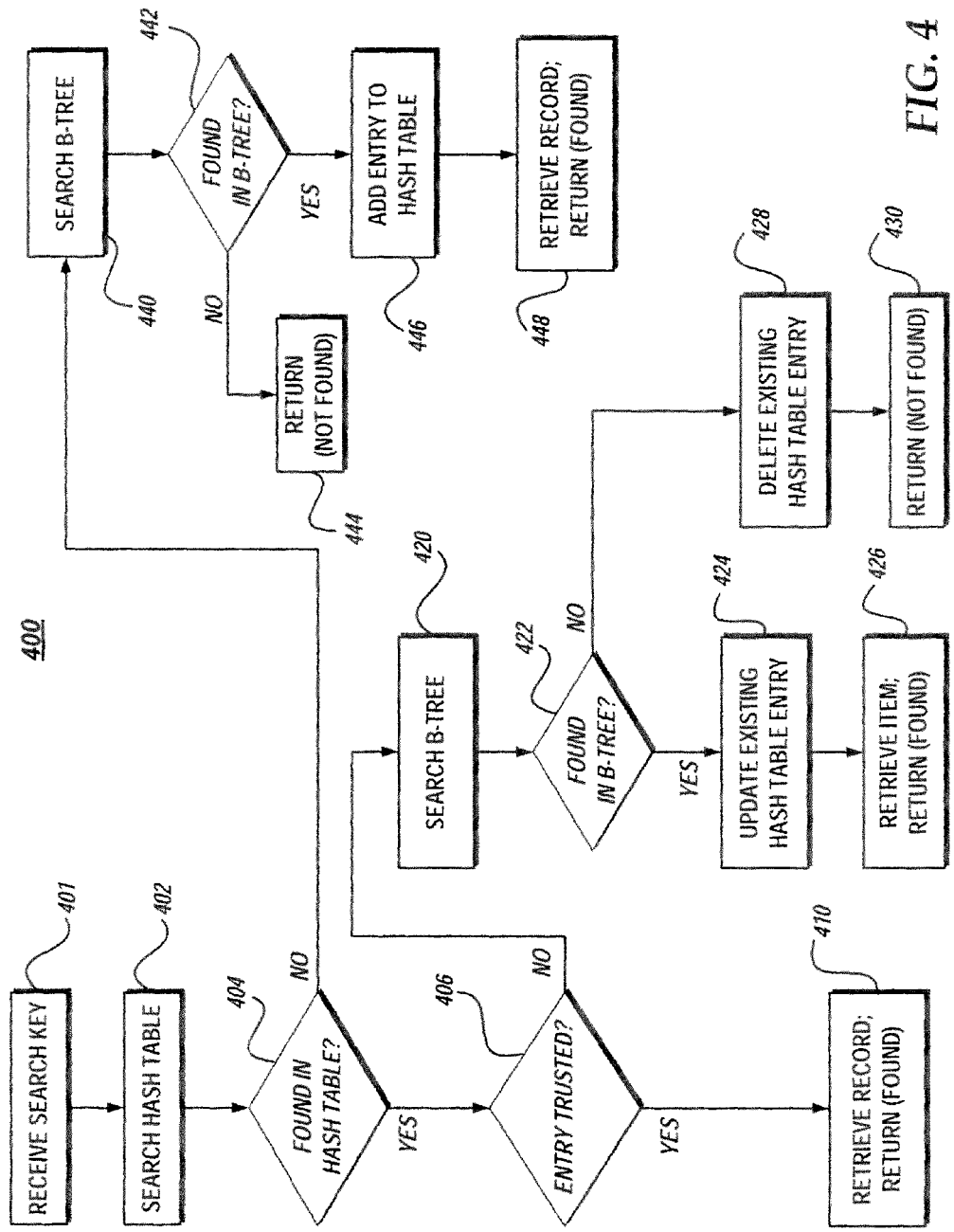
FIG. 4 is a flow diagram illustrating a process of searching for a B-tree record by using a lazy hash table, in an example embodiment.

In some embodiments, hash table 330 may be incomplete or out of date, as compared with B-tree 302. For example, an aux page ID 338 may point to a leaf node 308 that has been split into two leaf nodes or no longer exists. The keys 318 in the leaf node 308 may have changed so that they do not correctly correspond to the desired key. In one implementation, when a hash table entry 332 is used to determine a leaf node 308, the aux LSN 342 is compared with the leaf node LSN 314. A match may indicate that the entry 332 is valid. Though a non-match does not necessarily indicate that the entry 332 is invalid, it indicates that the entry 332 cannot be trusted to be valid. In this situation, a traversal of the B-tree 302 may be performed to locate the desired record. This process is illustrated in FIG. 4 and discussed herein.

One type of hash table is referred to herein as a "lazy hash table." In a lazy hash table, there may be keys in the B-tree that do not have corresponding entries in the hash table. Some aux entries 332 may not have valid values. Some records 316 corresponding to aux keys may have been removed from the database; some may have been moved to a different page or to a different position within the page. Leaf nodes may have been changed in a way such that the hash table entries pointing to it cannot be trusted to be accurate.

Actions of an auxiliary index manager on a lazy hash table may include any one or more of the following. A lazy hash table may be created after an associated B-tree is at least partially populated, such that records prior to that point are not reflected in the lazy hash table. In one embodiment, insertions, deletions, or updates of data records in the B-tree are not reflected in the associated lazy hash table. In one embodiment, entries of a lazy hash table may be deleted due to insufficient memory. Any one of these behaviors may result in a lazy hash table having entries that are missing or of uncertain validity.

As a result of these behaviors and the uncertain nature of a lazy hash table, various embodiments include actions to accommodate for the uncertainty. FIG. 4 is a flow diagram illustrating a process 400 of searching for a B-tree record by using an auxiliary index in the form of a lazy hash table, in an example embodiment. In one embodiment, at least a portion of the actions of process 400 are performed by auxiliary index manager 224. In one embodiment, hash table 330 is used as a lazy hash table, though other embodiments of a hash table may be used.

The illustrated portions of process 400 may be initiated at block 401, where a search key value is received. The process may flow to block 402, where the hash table is searched for an entry 332 with an aux key 336 that matches the search key. The process may flow to decision block 404, where a determination is made of whether an entry with a matching aux key was found in the hash table. As illustrated in FIG. 3, entry 332 may include an aux page ID, an aux slot ID, and an aux LSN. As used herein, the term "matching" does not require that keys be equal or identical. For example, due to normalization of keys, two keys may match even though the case of letters may differ, whitespace may differ, or different characters may be configured to be considered as equivalent. Thus, the term "matching" may vary based on an implementation and configuration.

If the entry was found, the process may flow to decision block 406, where a determination is made of whether the entry is trusted. In one embodiment, each block of memory either has an owner or is free. A determination of whether the entry is trusted may include determining whether the referenced page has an owner and the owner is B-tree manager 222. If not, the page is considered to be invalid, and therefore the entry is distrusted. As discussed herein, in one embodiment, each time a page is modified by B-tree manager 222, the corresponding LSN value is modified. This includes, for example, inserts, deletions, splitting a page, or merging pages. Though some changes to a page may not cause the data of a hash table entry to be invalid, some changes may cause the aux page ID or the aux slot ID to be incorrect. In one embodiment, the aux LSN 342 is compared to the BT LSN 314 in the referenced page. A match indicates that the page has not been modified since the previous time that the aux LSN was extracted from the page. If the LSN values do not match, the page is considered to be distrusted. As used herein, the term "trusted" with respect to an entry refers to entries that are known to be valid and are trusted. The term "distrusted" refers to entries that are not trusted because they are not known to be valid or are not trusted for another reason, such as a change in the referenced page.

In one implementation, the actions of decision block 406 may include verifying that the hash table entry remains in the hash table after acquiring a latch to the referenced page. For example, after a first search of the hash table, the BT page pointed to by the aux page ID may be latched by auxiliary index manager 224. After acquiring a latch for the referenced page, a second search of the hash table, based on the same search key, may be performed. If the entry is found in the second search, this indicates that the hash table entry is in synch with the B-tree. This mechanism for determining whether to trust an entry may substitute for the above-described technique of checking the owner and the LSN value. In one implementation, a rundown protection lock may be acquired for the B-tree page prior to comparing the aux LSN with the B-tree page LSN, to prevent the page from being deallocated during this time.

If, at decision block 406, it is determined that the entry is trusted, the process may flow to block 410, where the corresponding record may be retrieved. In one embodiment, this may include using the aux slot ID 340 to locate the referenced B-tree slot 320, using the B-tree slot 320 to locate the record, and retrieving data from the record. In some configurations the record may be located outside of the B-tree leaf node, and located by use of the B-tree slot 320. In one embodiment, at least some of the actions of block 410 are performed by data record component 220. The process may return to a calling program with a status of "found."

At decision block 406, if it is determined that the entry is distrusted, process 400 may flow to block 420, where a search of the B-tree 203 is performed. In one embodiment, this search begins at the B-tree root node 304. As illustrated, in some embodiments with a lazy hash table, a search of the B-tree is selectively performed, based on the results of searching the hash table.

The process may flow to decision block 422, where a determination is made of whether the search of the B-tree resulted in a B-tree key matching the search key being found. If it is determined that a matching B-tree key was found, the process may flow to block 424. At this point, in the illustrated embodiment, the found B-tree key has a corresponding entry in the lazy hash table, though the entry record not trusted. At block 424, the hash table entry may be updated so that it is trusted. This may include updating one or more of the aux page ID, the aux LSN, or the aux slot ID.

The process may flow to block 426, where the record corresponding to the search key may be retrieved, and the process may return to a calling program with a status of "found."

If, at decision block 422, it is determined that a B-tree key matching the search key was not found, the process may flow to block 428. At this point, in the illustrated embodiment, an entry exists in the lazy hash table for which there is not a corresponding key and record in the B-tree. At block 428, the hash table entry found at block 402, corresponding to the search key, may be deleted from the hash table. The process may flow to block 430, where the process may return to a calling program with a status of "not found."

Returning to decision block 404, after searching the hash table, if it is determined that an aux key matching the search key was not found in the hash table, the process may flow to block 440, where a search of the B-tree 203 is performed. This search may begin at the B-tree root node 302.

The process may flow to decision block 442, where a determination is made of whether the search of the B-tree resulted in the search key being found. If it is determined that a B-tree key matching the search key was found, the process may flow to block 446. At this point, in the illustrated embodiment, the found record does not have a corresponding entry in the hash table. At block 446, an entry with the search key value may be added to the hash table. The entry may have the aux page ID, aux slot ID, and aux LSN corresponding to the found record, its page, and slot.

The process may flow to block 448, where the record corresponding to the search key may be retrieved, and the process may return to a calling program with a status of "found."

If, at decision block 442, it is determined that the search key was not found in the B-tree, the process may flow to block 444. At this point, in the illustrated embodiment, an entry corresponding to the search key does not exist in the B-tree or the hash table. Therefore, an update to the hash table is not performed. At block 444, the process may return to a calling program with a status of "not found."

In one embodiment, the actions of decision block 406 may determine whether the referenced page is valid, without regard to the aux LSN value. As discussed above, this may include determining whether the referenced page has an owner and the owner is B-tree manager 222. It may also include determining, if the owner is B-tree manager 222, whether the page is the same node, or whether it has been deallocated and reallocated as a different node. One way to do this is to check whether the node is a leaf node and, if it is, whether the search key falls within the bounds of the node. The latter check may be performed by determining whether the search key falls between the first key and the last key, inclusively, of the node. Another way to perform this check is to maintain a tag, similar to an LSN value, that is modified when a new node is created or a node is split.

In one embodiment, if it is determined that the referenced page is valid the process may determine whether the aux slot ID is trusted by comparing the aux LSN value with the page LSN value, as described above, or by using the aux slot ID to retrieve the corresponding BT key and determining whether this matches the search key. If the aux slot ID is trusted, the process may proceed to block 410, as described above. If the referenced page is valid and the slot ID is not trusted, the process may perform a search within the BT leaf node for the search key value. The process may flow to block 422 and determine whether the search key value is found, continuing as described herein. Thus, in some embodiments, the process may employ the aux index to go directly to the desired record, employ the aux index to go to the desired BT leaf node, or perform a complete search of the B-tree.

Two properties of process 400 may be noted. One is that when a search key is found in the lazy hash table and the corresponding entry is determined to be valid and trusted (as indicated by reaching block 410, the search time is less than a search of the B-tree. This results from searching the hash table instead of the B-tree, wherein a successful search of the hash table is faster than a successful search of the B-tree.

The second property is that when a search key is not found in the lazy hash table, or it is found but the corresponding entry is determined to be distrusted, the process results in a search of both the lazy hash table and the B-tree. This may take more time than a simple search of just the B-tree.

The degree to which process 400 accelerates key searches therefore increases as the percentage of successful hash table searches increases. Several factors may contribute to this percentage. One is the completeness of the lazy hash table, in relation to the number of B-tree records. Another factor may be the frequency of accesses for keys in the lazy hash table relative to keys in the B-tree that are not in the lazy hash table. Yet another factor is the environment and the ratio of positive searches to negative searches. A positive search is a search in which a target record is found; a negative search is a search in which no target record is found. For example, in an environment in which a customer swipes an identification card at an ATM machine, credit card reader, security card reader, or other such client device, there is likely to be a high percentage of key searches in which the key exists in the B-tree. Therefore, a well-populated lazy hash table is likely to have a high percentage of successful searches. Another factor is the ratio of read-only operations to write operations on the B-tree. In a write operation, the B-tree may be changed, resulting in one or more aux entries becoming distrusted. A high ratio of read-only to write operations may tend to have less distrusted entries.

In the illustrated embodiment of FIG. 4, an entry is updated or added to the lazy hash table each time a valid and trusted entry is not found and the key is found in the B-tree (at blocks 426 or 448). To the extent that recently searched keys are "hotter" than other keys, this may improve the degree to which a lazy hash table accelerates a B-tree.

As discussed herein, in some embodiments, the size of an auxiliary index may be based on an amount of available memory. Thus, a lazy hash table may be limited in its growth, or may be reduced in size, based on memory configuration and the environment. Thus, smaller amounts of available memory may be a detriment to the effectiveness of a lazy hash table. Related to this is the number of records, or size of a table that is associated with the B-tree. Smaller tables may have lazy hash tables that use less memory. Also, a lazy hash table of a specific size is more likely to include an entry of a smaller table.

As discussed in further detail herein, in one embodiment, a determination of whether to employ a lazy hash table may be based on one or more of a number of factors, such as the completeness of the hash table, the extent to which the keys in the hash table are "hot," the extent to which search keys are found in the B-tree, an amount of available memory, a ratio of read-only to write operations, or a data table size.

One type of hash table is referred to herein as a "definitive hash table." In a definitive hash table, auxiliary index manager performs actions to maintain the hash table to be in sync with the B-tree. As a result, there is a one-to-one correspondence between keys in the B-tree and key values in the hash table. In one embodiment, the actions of an auxiliary index manager on a definitive hash table include propagating B-tree updates to the hash table, so that hash table entries are added, deleted, or updated based on changes to the B-tree.

Figure 5A:
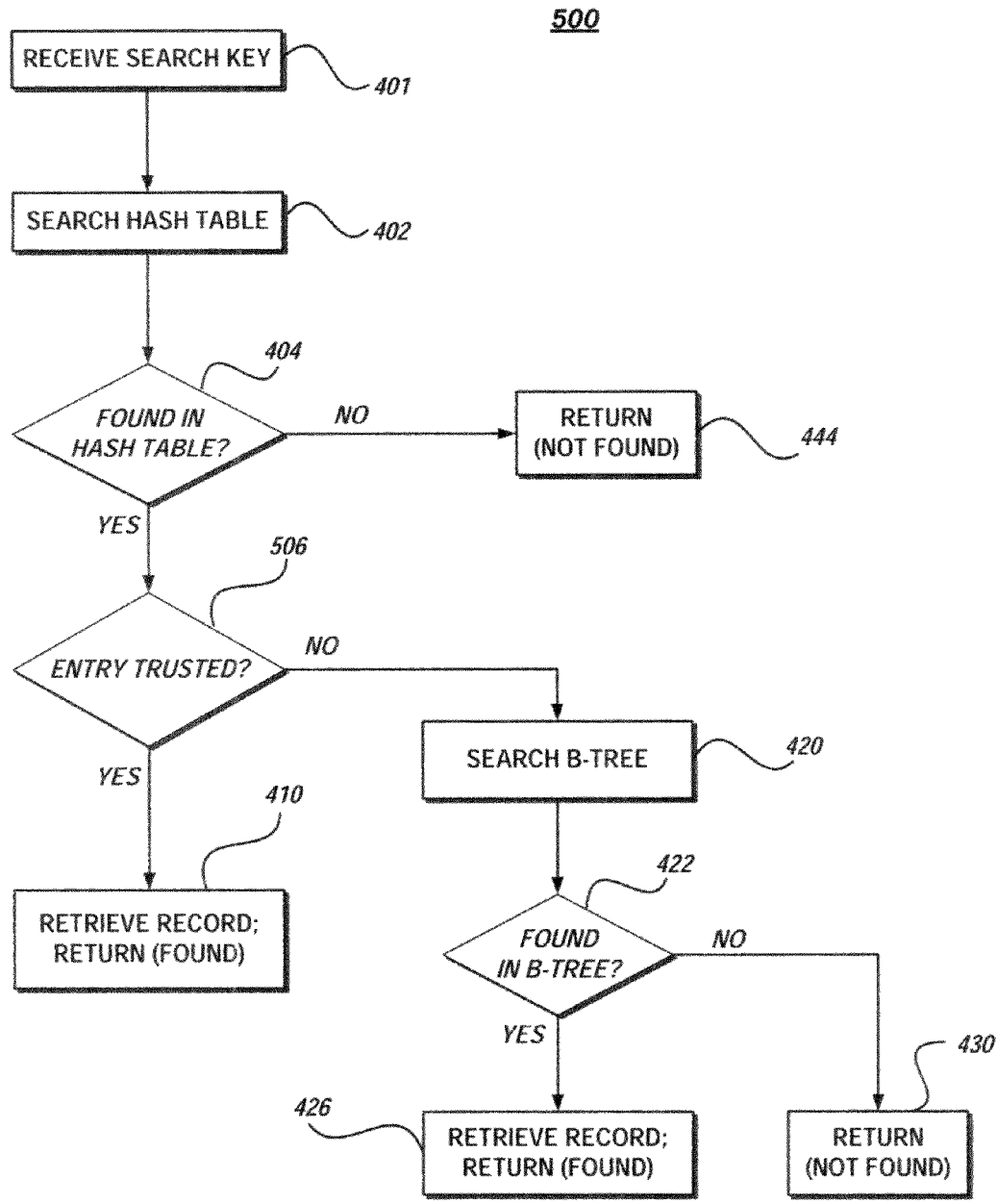
FIG. 5A is a flow diagram illustrating a process of searching for a B-tree record by using a definitive hash table, in an example embodiment.

FIG. 5A is a flow diagram illustrating a process 500 of searching for a B-tree record by using a definitive hash table, in an example embodiment. In one embodiment, at least a portion of the actions of process 500 are performed by auxiliary index manager 224. In one embodiment, hash table 330 is used as a definitive hash table, though other embodiments of a hash table may be used. In the illustrated example embodiment, process 500 includes blocks with reference numbers equal to like reference numbers in process 400. In one embodiment, the actions of each of these blocks may be similar or the same as for the corresponding block of process 400, and the descriptions with respect to process 400 may apply to the corresponding block of process 500.

The illustrated portions of process 500 may be initiated at block 501, where a search key is received. The process may flow to block 402, where the definitive hash table is searched for an entry 332 with an aux key 336 that matches the search key. The process may flow to decision block 404, where a determination is made of whether an entry with a matching aux key was found in the hash table.

If the search key was found, the process may flow to decision block 506, where a determination is made of whether the entry is trusted. Though a definitive hash table is designed to be in synch with the corresponding B-tree, due to update delays, there may be periods of time when the hash table has not been updated and portions of it may be in an "unstable" state. If an entry that is to be changed is searched for during this time period, a race condition may result, such that an entry that is found may be distrusted. Therefore, the test of decision block 506 may be performed to determine whether this has occurred. The test of decision block 506 is similar to the test of decision block 406, and the description of the latter is applicable to decision block 506. This may include determining whether B-tree manager 222 is the owner of the referenced page or whether the aux LSN value matches the LSN value of the referenced page. It may include verifying that the hash table entry remains in the hash table after acquiring a latch to the referenced page.

If, at decision block 506, it is determined that the entry is trusted, the process may flow to block 410, where the corresponding record is retrieved. The actions of block 410 may be as described for block 410 of FIG. 4. The process may return to a calling program with a status of "found."

At decision block 506, if it is determined that the entry is distrusted, process 500 may flow to block 420, where a search of the B-tree may be performed. The search of the B-tree may begin at B-tree root node 302. As illustrated, in some embodiments with a definitive hash table, a search of the B-tree is selectively performed, based on the results of searching the hash table.

The process may flow to decision block 422, where a determination is made of whether the search of the B-tree resulted in B-tree key matching the search key being found. If it is determined that a matching B-tree key was found in the B-tree, the process may flow to block 426, where the record corresponding to the search key may be retrieved, and the process may return to a calling program with a status of "found," as described at block 410.

If, at block 422, it is determined that the search key was not found in the B-tree, the process may flow to block 430, where the process may return to a calling program with a status of "not found."

Returning to block 404, if it is determined that the search key is not found in the definitive hash table, the failure to find the search key in the definitive hash table indicates that the search key is not in the B-tree. The process may flow from block 404 to block 444. At block 444, the process may return to a calling program with a status of "not found."

Because a definitive hash table is considered to be in sync with the associated B-tree, the illustrated embodiment of process 500 does not include a search of the B-tree if an entry is not found in the definitive hash table. A search in which a search key is not found is referred to as a "negative search." As illustrated by the example embodiments of process 400 and process 500, a search of a definitive hash table may result in fewer operations and take less time than a corresponding search of a lazy hash table, particularly for negative searches or searches that yield distrusted page IDs. However, there is generally more work involved in maintaining a definitive hash table.

The illustrated embodiment of process 500 also does not include actions 424 of process 400, of updating the hash table if a found entry is not trusted and the key is found in the B-tree, at block 422. In one implementation, this situation indicates that an update to the hash table is in progress, but has not yet been completed. Therefore, it is not necessary to perform an update as part of process 500.

One embodiment of process 500 may include actions of determining, at block 506, whether a referenced page is valid. As discussed with reference to block 406 above, if a referenced page is valid and a slot ID is not, the referenced leaf node may be searched for the search key. The process may flow to block 422 and continue as described herein.

One type of definitive hash table is a "row hash table." In a row hash table, aux entry 332 may include a copy of the BT record 316, or a portion thereof. In one embodiment, the portion of the BT record 316 that is copied in aux entry 332 may include selected columns of the BT record. In one implementation, the selected columns may be columns that are identified as the most accessed columns. In one implementation, the set of selected columns that are copied in the aux entry are the same in all entries; in one implementation, the set of selected columns may differ among entries. For example, the number of columns included in an entry may be based on the key size, the record size, or the size of a portion of the record. With a row hash table, record data may be retrieved directly from the hash table, without latching and accessing the BT page.

Figure 5B:
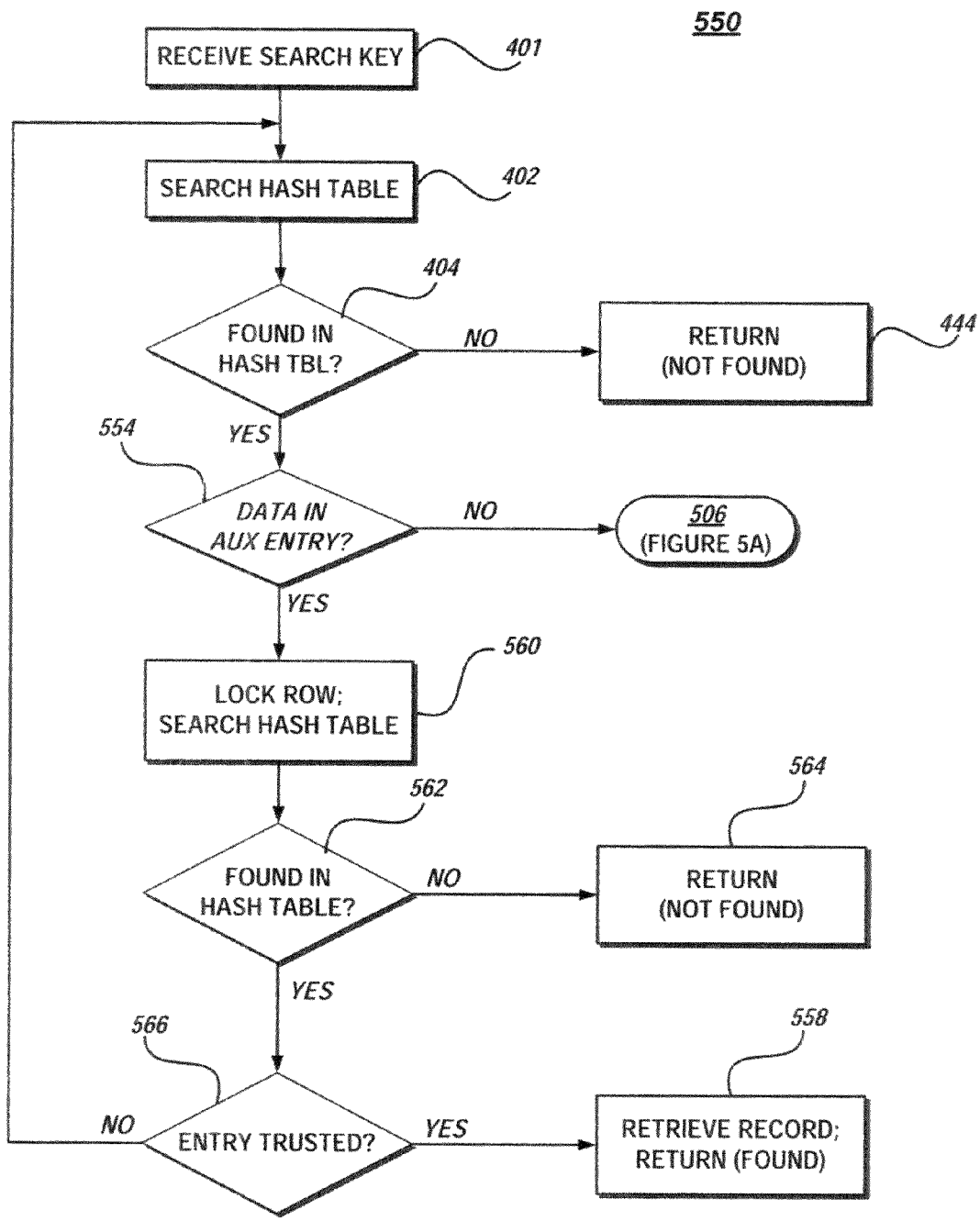
FIG. 5B is a flow diagram illustrating a process of searching for a B-tree record by using a row hash table, in an example embodiment.

Process 500, or a portion thereof, may be used with a row hash table. FIG. 5B is a flow diagram illustrating a process 550 of searching for a B-tree record by using a row hash table, in an example embodiment. In one embodiment, at least a portion of the actions of process 550 are performed by auxiliary index manager 224. In one embodiment, hash table 330 is used as a definitive hash table, though other embodiments of a hash table may be used. In the illustrated example embodiment, process 550 includes blocks with reference numbers equal to like reference numbers in processes 400 and 500. In one embodiment, the actions of each of these blocks may be similar or the same as for the corresponding block of process 400, and the descriptions with respect to processes 400 or 500 may apply to the corresponding block of process 550.

The illustrated portions of process 550 may be initiated at block 501, where a search key is received. The process may flow to block 402, where the definitive hash table is searched for an entry 332 with an aux key 336 that matches the search key. The process may flow to decision block 404, where a determination is made of whether an entry with a matching aux key was found in the hash table.

If the search key was found, the process may flow to decision block 554. As discussed herein, the columns of a record maintained in each row hash table entry may be the same or may differ among entries. In one embodiment, process 550 may include a determination of whether the desired data record, or portion thereof, is contained within the found entry of the row hash table. If it is not, the process may flow to block 506 of process 500, and continue process 500 as described herein. In various embodiments, the determination of decision block 554 may be performed at other places in process 500, and the process may selectively flow to other blocks of process 500.

If, at decision block 554, it is determined that the found entry includes the desired portions of the data record, the process may perform a check to determine whether the entry is trusted. In one embodiment, this check includes locking the row and then verifying that the entry remains in the hash table. The check may begin at block 560, where a lock for the row in the B-tree corresponding to the entry found at block 402 is obtained. In one embodiment, this lock is a transactional lock acquired on the key corresponding to the row. Once the lock is obtained, another search of the row hash table for the search key may be performed.

The process may flow to decision block 562, where a determination is made of whether an entry with an aux key that matches the search key is found as a result of the search at block 560. If such an entry is not found, this serves as an indication that the entry previously found is not valid. The entry may have been removed, or the key may have been changed. The process may flow to block 564, where the process returns with a status of "not found."

If, at decision block 562, it is determined that a matching entry is found, the process may flow to decision block 566, where a determination is made of whether the entry is trusted. In one embodiment, the entry may be trusted as a result of finding the entry while the searching process held a lock for the row, as discussed with respect to block 560. In one embodiment, the process may maintain a copy of the row in the entry as found during the search of block 402 and compare this copy with the row of the entry found during the search of block 560. If the contents of both rows match, it indicates that the row has not changed, and the entry is considered to be trusted. It is to be noted that, in some implementations and configurations, the entries found at block 402 and block 560 are the same entry, though this is not necessarily the case.

In one embodiment, the determination at decision block 566 may include determining whether the B-tree page pointed to by the entry found at block 560 is the same page as the B-tree page pointed to by the entry found at block 402. Though the entry may be the same entry, the aux page ID may have changed. A change in the page ID may indicate that the entry is not trusted. In various embodiments, other data may indicate whether the entry is to be trusted.

If, at decision block 566, it is determined that the entry is trusted, the process may flow to block 558, where the data is retrieved from the aux record field of the aux entry. The process may return to a calling program with a status of "found." If, at decision block 566, the entry is not trusted, the process may flow back to block 402 where a new search of the row hash table may be performed. The process may continue as described above. In one embodiment, prior to flowing from decision block 566 to block 402, any lock held on the row may be released.

In one embodiment, locking a row, as discussed above, includes following the hierarchy of locks and associated protocols that protects the row in the B-tree. This may include checking each lock and, if not already held, acquiring the lock. In one embodiment, a hierarchy of locks protecting a row includes B-tree, page, and row, in that order. In one embodiment, a hierarchy includes page and row, but not the B-tree. In one embodiment, a hierarchy does not include pages. Thus, acquiring a lock, as described with respect to process 550, may include employing the same protocol that is used to maintain the B-tree.

As discussed for other types of auxiliary indices, a row hash table may be selectively discarded based on a number of factors, such as an amount of available cache, an amount of available main memory, a number of data records associated with the B-tree, or a ratio of positive searches to negative searches. For each of the hash table indices, in some implementations, a range search may be performed by using the auxiliary index to locate a slot in the B-tree corresponding to the lower bound and scanning to the right in the B-tree until the upper bound is reached. Thus, even when a row hash table contains the data for the lower bound, a B-tree scan may be used to obtain the remaining data. Additionally, in a range search in which the lower bound is not found in the hash table index, the B-tree may be searched to find the slot corresponding to the lower bound.

In one embodiment, a definitive hash table may be converted into a lazy hash table. This may occur, for example, if a data table grows to a size that requires a high amount of memory, or if for another reason memory becomes insufficient to maintain a definitive hash table. It may also occur if there is an inability to maintain synchronization with the B-tree, or due to a failure to insert a key into the hash table. By employing a hash table structure that may serve as a definitive hash table or a lazy hash table, the system may convert a definitive hash table to a lazy hash table. It is to be noted that in some embodiments, converting a definitive hash table to a lazy hash table does not include a change to the hash table structure itself, but rather a change to the processes of auxiliary index manager 224 or related components. It may include, for example, ceasing the performance of process 500 and performing process 400 instead. In one embodiment, operation of a lazy hash table may employ process 400 and also include some actions of updating the hash table in response to updates to the B-tree. This may reduce the number of negative hash table searches or distrusted entries without including all of the overhead of a definitive hash table.

Because a negative search of a definitive hash table may avoid a search of the B-tree, definitive hash tables have an advantage as compared with lazy hash tables, particularly in an environment with higher numbers of negative searches. As discussed in further detail herein, a determination of whether to employ a definitive hash table may be based on one or more of a number of factors, such as the number of negative searches, the number of updates, an amount of available memory, or the size of the data table. Because a definitive hash table has entries for every record of the B-tree, cache usage or memory usage for a definitive hash table may be higher than for a lazy hash table.

Figure 6A:
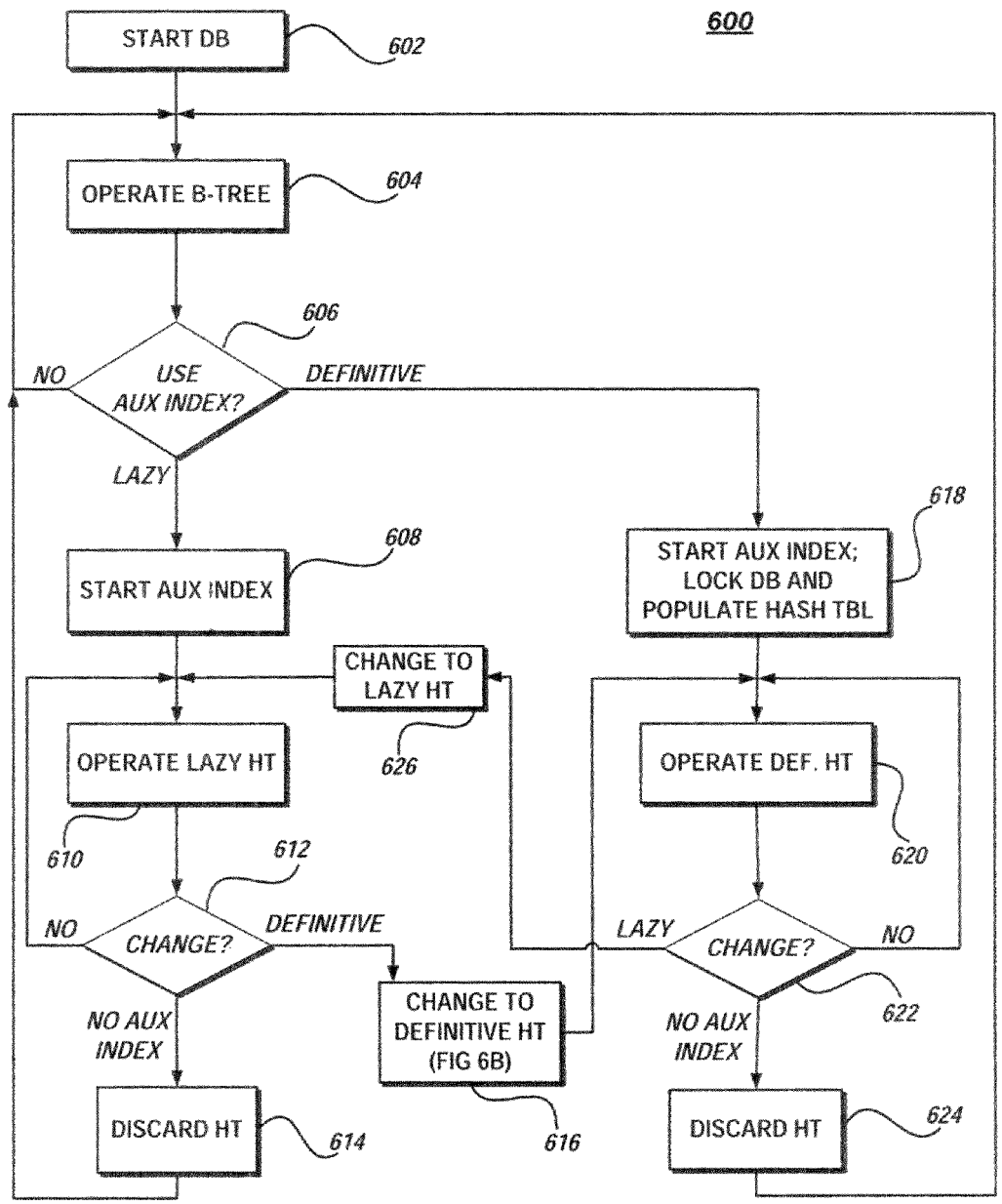
FIGS. 6A-B are flow diagrams illustrating a process of automatically employing or modifying an auxiliary index, in an example embodiment.

FIG. 6 is a flow diagram illustrating a process 600 of automatically making decisions of whether to employ an auxiliary index, in an example embodiment. In one embodiment, at least a portion of the actions of process 600 are performed by auxiliary index manager 224.

The illustrated portions of process 600 may be initiated at block 602, where a database employing a B-tree, such as B-tree 302, is started. In various configurations, the database may be empty or it may have one or more records. The process may flow to block 604, where the B-tree may begin operation. This may include performing searches, inserts, deletes, updates, or other operations. In one embodiment, the process may flow to decision block 606 without performing the actions of block 604.

At decision block 606, a determination may be automatically made of whether to use an auxiliary index and if so, what type of auxiliary index to use. The illustrated embodiment includes a lazy hash table and a definitive hash table as the implementations of available auxiliary indices, though in various embodiments, a top level auxiliary index (discussed below) other types of indices may be used.

The actions of decision block 606 may include gathering various data and automatically making a determination based on the data and on configured rules, thresholds, or other considerations. In an environment in which the B-tree has been operating, various metrics may be collected pertaining to its operation. This may include, for example, a number of read-only operations, a number of write operations, a number of positive searches, a number of negative searches, a ratio of positive searches to negative searches, a frequency of changes to internal B-tree nodes, or other dynamic metrics. In one embodiment, metrics are collected during a rolling window of time, such that metrics of the most recent events are kept. In some embodiments, metrics may have been gathered during one or more prior times that the B-tree operated on the particular database table. These metrics may be used to automatically make a determination at a system restart.

In some embodiments, metrics may be gathered pertaining to a system configuration. These metrics may include the number of data records stored within or associated with the B-tree, an amount of available main memory, an amount of available cache, a depth of the B-tree, or other such metrics.

The determination of decision block 606 may be made based on any one or combination of these metrics. For example, a large database table may disfavor use of a hash table, and particularly a definitive hash table. Higher amounts of available cache or higher amounts of main memory may favor the use of a hash table, but if not high enough to include a substantial portion of a definitive hash table, it may favor the use of a lazy hash table. A read-mostly environment may favor the use of a hash table, and a high percentage of read operations may favor the hash table even more. A small set of frequently accessed keys relative to the total number of keys in the database table may favor the use of a lazy hash table.

In the illustrated embodiment, there may be one of three outcomes of decision block 606. If it is determined that an auxiliary index is not to be used, the process may flow back to block 604, where the B-tree continues to operate without an auxiliary index. As illustrated, the actions of decision block 606 may be performed at various times during the operation of the B-tree. The outcome may change in subsequent determinations, due to new or changed metrics received, or configuration changes by an administrator.

If, at decision block 606, a determination is made to employ a definitive hash table, the process may flow to block 618, where a definitive hash table may be started. The actions of block 618 may include populating the definitive hash table with keys from the B-tree. In one embodiment, this may include locking the B-tree to prevent updates while populating the definitive hash table. The process may flow from block 616 to block 620, where the definitive hash table is operated in conjunction with the B-tree. In one embodiment, this includes performing at least a portion of process 500, or variations thereof. The process may flow to decision block 622. The actions of decision block 622 are discussed below.

If, at decision block 606, a determination is made to employ a lazy hash table, process 600 may flow to block 608, where an auxiliary index system, and particularly a lazy hash table system, may be started. The actions of block 608 may include creating a hash table, such as hash table 330 of FIG. 3, initiating auxiliary index manager 224, or other actions.

The process may flow to block 610, where the lazy hash table is operated in conjunction with the B-tree. In one embodiment, this includes performing at least a portion of process 400, or variations thereof.

The process may flow to decision block 612, where a determination of whether to change the use of the lazy hash table is made. This determination is similar to the actions of decision block 606, and the discussion of decision block 606 applies to decision block 612. There may be additional metrics to use at decision block 612, such as recent metrics on the use of the lazy hash table. Also, there may be current values of any of the metrics discussed with respect to decision block 606.

If, at decision block 612, it is determined to not change the use of the lazy hash table, the process may flow back to block 610, where the lazy hash table continues to be operated in conjunction with the B-tree. As illustrated in the example embodiment of FIG. 6, a determination of whether to change the use of the lazy hash table may be made at various times during its operation.

If, at decision block 612, it is determined to terminate use of an auxiliary index, the process may flow to block 614, where the lazy hash table is discarded. Discarding the lazy hash table may include releasing cache or main memory allocated to store at least portions of the hash table. The process may flow back to block 604, where the B-tree is operated without an auxiliary index system, as discussed above. This may include performing additional searches of the B-tree for additional data records corresponding to additional search keys without employing the lazy hash table.

Figure 6B:
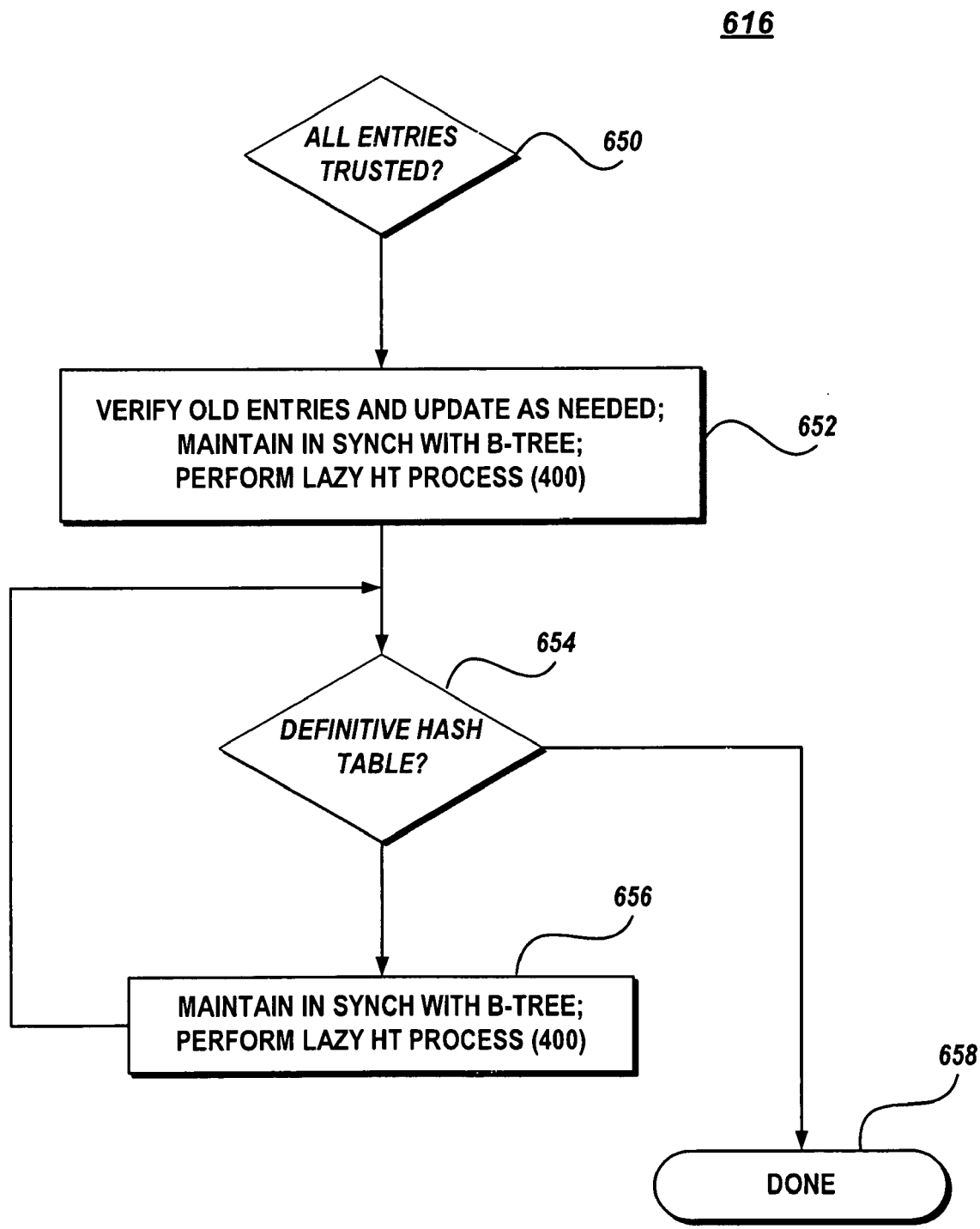

If, at decision block 612, it is determined to begin using a definitive hash table instead of the lazy hash table, the process may flow to block 616, where the lazy hash table is converted to a definitive hash table. FIG. 6B illustrates an example of actions that may be performed in block 616.

The process may flow from block 616 to block 620, where the definitive hash table is operated in conjunction with the B-tree. In one embodiment, this includes performing at least a portion of process 500, or variations thereof.

The process may flow to decision block 622, where a determination of whether to change the use of the definitive hash table is made. This determination is similar to the actions of decision block 606, and the discussion of decision block 606 applies to decision block 622. There may be additional metrics to use at decision block 622, such as recent metrics on the use of the definitive hash table. Also, there may be current values of any of the metrics discussed with respect to decision block 606.

In one embodiment, the determination of decision block 622 may be based on a possibility of failure in the definitive hash table. In some implementations, actions of maintaining synchronization with the B-tree may fail, due to a design optimization for speed, while possibly sacrificing some transactional integrity. For example, in one embodiment, pages are not locked by the auxiliary index manager during search or update operations. This may allow an integrity failure to occur. If this event occurs, at block 622 a determination may be made to change to a lazy hash table or to change to cease using an auxiliary index.

If, at decision block 622, it is determined to not change the use of the definitive hash table, the process may flow back to block 620, where the definitive hash table continues to be operated in conjunction with the B-tree. As illustrated in the example embodiment of FIG. 6, a determination of whether to change the use of the definitive hash table may be made at various times during its operation.

If, at decision block 622, it is determined to terminate use of an auxiliary index, the process may flow to block 624, where the hash table is discarded. The process may flow back to block 604, where the B-tree is operated without an auxiliary index system, as discussed above.

If, at decision block 622, it is determined to begin using a lazy hash table instead of the definitive hash table, the process may flow to block 626, where the definitive hash table may be converted into a lazy hash table. In one embodiment, at least a portion of the hash table entries may be discarded. This may occur, for example, if a reason for changing to a lazy hash table was due to insufficient cache or insufficient main memory. In one embodiment, heuristics may be used to determine which entries to discard. For example, a list of recently searched or frequently searched keys may be maintained, and entries of keys not on this list may be discarded. In one embodiment, entries may be selectively discarded based on whether they are in a cache, or which cache they are in. In other embodiments, other rules may be used to determine which entries to discard or retain. In one embodiment, all entries may be discarded, or the entire hash table may be discarded and a new lazy hash table created. In one embodiment, changing from a definitive hash table to a lazy hash table includes modifying the update actions to not include maintaining the one-to-one correspondence between the B-tree keys and the auxiliary keys. The process may flow to block 610, where operation of a lazy hash table in conjunction with the B-tree is performed.

FIG. 6B illustrates, in further details, a process that may be performed as part of the actions of block 616, in an example embodiment. As illustrated in FIG. 6B, at decision block 650, a determination may be made of whether the entries in the lazy hash table are trusted. In one embodiment, if the B-tree has operated as a read-only B-tree since the creation of the lazy hash table, that is, there have been no changes that include invalidating a page or modifying an LSN, all of the hash table entries may be trusted.

If there are entries that are not trusted, or for which it may not be known whether they can be trusted, the process may flow to block 652. Block 652 includes three actions, which may be performed concurrently. One action is to maintain the hash table in synch with the B-tree, as described for a definitive hash table. This may include adding, deleting, or updating entries as described herein, to maintain synchronization between the hash table and the B-tree. A second action is to perform a lazy hash table process, such as process 400, for searches. That is, the hash table is used in a way that does not assume it is complete or that entries are trusted.

A third action of block 652 is to iterate through each hash table entry that existed at the moment of beginning block 652, and verify whether the entry is trusted. This may include verifying the page ID and the LSN, as discussed herein. Each entry that is not trusted may be updated or deleted. Some entries may be updated by updating the LSN value. Some may be updated by updating the LSN and the slot ID. Some may be updated by updating the page ID, the LSN, and the slot ID. In some implementations, if the BT page corresponding to the aux page ID is not owned by the B-tree manager, the aux entry may be deleted. In one embodiment, the actions of verifying each entry may include marking each entry prior to beginning block 652 or marking entries as they are verified or updated by the maintenance processes of block 652.

In one embodiment, when all previously existing entries have been verified or updated, the process may flow to decision block 654, where a determination is made of whether the hash table is definitive. In one embodiment, this may include determining whether the cardinality of the hash table matches the cardinality of the B-tree. The cardinality refers to the number of keys. If all hash table entries are trusted, and the cardinality of the hash table and the B-tree match, the hash table may be considered to be a definitive hash table. If the hash table is considered to be definitive, the process may flow to done block 658, and return to a calling program, such as process 600.

If, at decision block 654, it is determined that the hash table is not definitive, the process may flow to block 658. Block 658 includes two of the actions of block 652, which may be performed concurrently. These are the actions of maintaining the hash table in synch with the B-tree, and performing a lazy hash table process, such as process 400, for searches. The process may loop back to decision block 654 and continue until it is determined that the hash table is a definitive hash table.

In some configurations, the actions of block 616 may not reach a status where the hash table is a definitive hash table, due to one or more keys that are not accessed and thus are not added to the hash table. In one embodiment, additional actions of adding one or more entries to the hash table may be performed. For example, a process may retrieve keys from the B-tree and insert them into the hash table if they do not already have an entry. This process may be performed concurrently with the actions of block 656.

In one embodiment, the actions of block 616 may include locking the B-tree from changes while a definitive hash table is built. In one embodiment, entries of a lazy hash table may be deleted, the hash table repopulated with keys from the B-tree while the B-tree is locked.

In one embodiment, the auxiliary index system includes a top level auxiliary index. A top level auxiliary index is used to bypass one or more levels at the top of a B-tree, facilitating a partial search of the B-tree. A search using a top level auxiliary index determines a B-tree leaf node or internal node, and a partial search is performed beginning at the determined node. A partial search is a search that begins at an internal node or a leaf node of the B-tree. A top level auxiliary index may use an order preserving data structure, such that an ordering of records in the B-tree is represented in the data structure. The order may be lexicographic, numeric, or any other type of ordering. In one implementation, auxiliary index manager 224 may include or employ a comparator component that compares keys based on their ordering, where the ordering is consistent with an ordering that the B-tree uses.

A binary search tree, referred to herein simply as a binary tree, is an example of an order preserving structure that may be used with a top level auxiliary index. A cache oblivious binary tree is a binary tree that is optimized for use with one or more caches. In one embodiment, an order preserving structure other than a binary tree may be used to implement the auxiliary index. This may, for example, be a tree structure other than a binary tree, or structure other than a tree. In one embodiment, the order preserving structure may be a cache oblivious structure or a cache aware structure.

Figure 7:
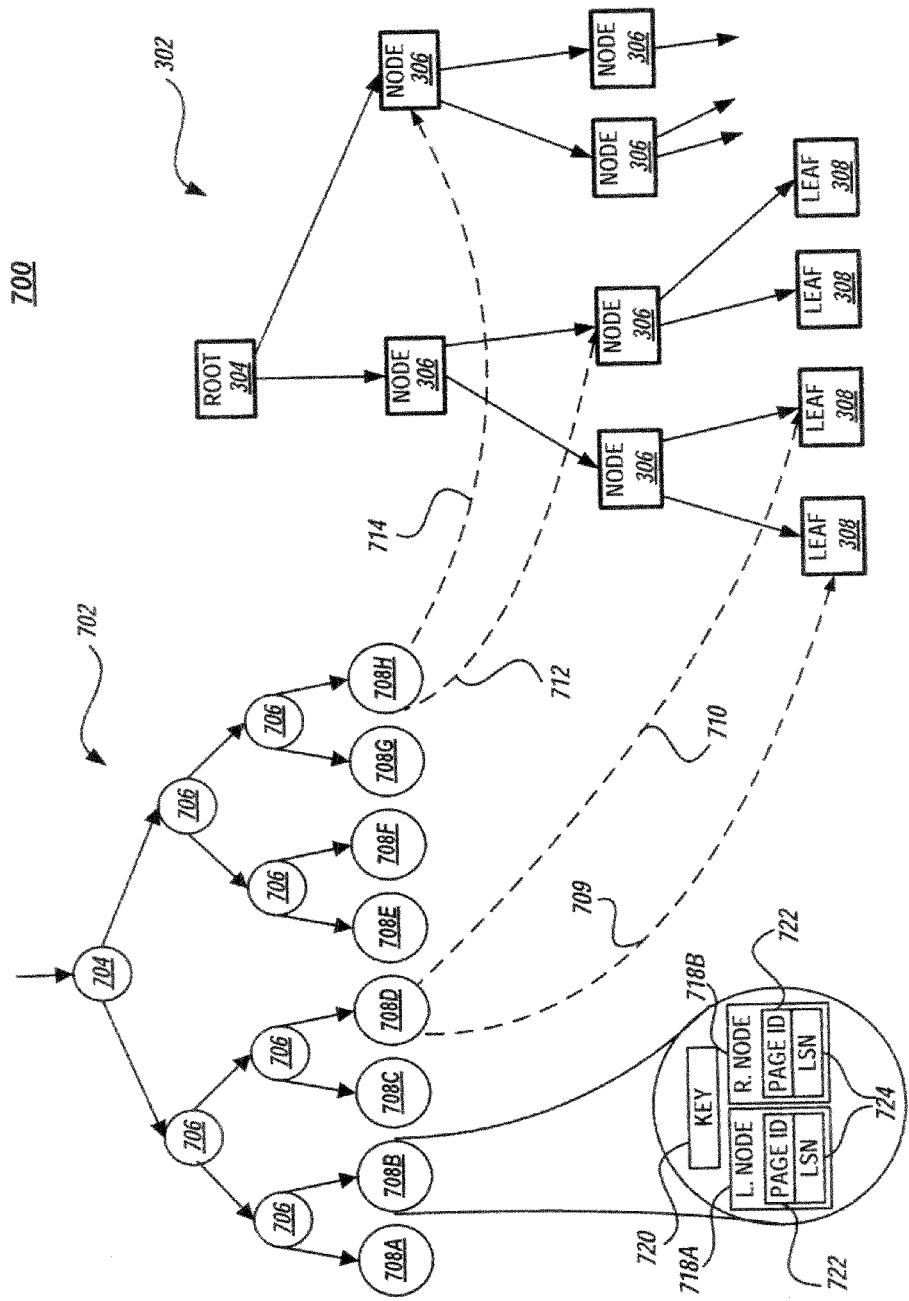
FIG. 7 is a block diagram of an example top level auxiliary index system that may be generated and employed by one or more of the mechanisms herein described.

FIG. 7 is a block diagram of an example top level auxiliary index system 700 that may be generated and employed by one or more of the mechanisms herein described. As illustrated, top level auxiliary index system 700 includes B-tree 302, as illustrated in FIG. 3 and described herein. B-tree 302 may have a variety of configurations, in terms of its fan out, size, depth, or other characteristics. B-tree 302 includes root node 304, internal nodes 306, and leaf nodes 308, as described with respect to FIG. 3. The illustration of B-tree 302 in FIG. 7 includes only a sampling of nodes, though it may include more or less nodes as discussed.

FIG. 7 also includes an example configuration of an order preserving structure. In this example, the order preserving structure is a binary tree 702. As discussed above, in one embodiment, binary tree 702 may be a cache oblivious binary tree. Binary tree 702 may include a root node 704, one or more internal nodes 706, and multiple leaf nodes 708*a-h*. In the example configuration, leaf nodes 708*a-h* are at level 3. Various configurations may include more or less nodes, and may differ in the number of levels.

The exploded view of leaf node 708*b* illustrates, in greater detail, an example embodiment of a binary tree leaf node. In the example embodiment, leaf node 708*b* includes entry aux key 720, left node entry 718*a*, and right node entry 718*b*. In one embodiment, the left node entry corresponds to a B-tree node having key values less than aux key value 720; the right node entry 718*b* corresponds to a B-tree node having key values greater than or equal to aux key value 720. Each of left node entry 718*a* and right node entry 718*b* include a page ID 722, and an LSN 724. The page ID 722 may serve as a pointer to a node of the B-tree 302, as represented by dashed arrows 709-714. LSN 724 corresponds to the B-tree LSN of the node pointed to by the corresponding page ID 722. In one implementation, the illustrated contents of binary tree leaf node 708 may be distributed over three nodes. One node includes aux key 720, a pointer to a second node that includes left node entry 718*a*, and a pointer to a third node that includes right node entry 718*b*. As used herein, references to a binary tree leaf node refer to a logical structure that may include an aux key value, a left node entry, and a right node entry, regardless of whether the leaf node is implemented as a single node or multiple nodes.

Each page ID 722 may point to a B-tree internal node 306 or a B-tree leaf node 308. In the illustrated example configuration, the left node entry of binary tree leaf node 708*d* points to a B-tree leaf node 308 as represented by dashed arrow 709; the right node entry of binary tree leaf node 708*d* points to a B-tree leaf node 308, as represented by dashed arrow 710; binary tree leaf node 708*h* points to internal nodes at different levels, as represented by dashed arrows 712 and 714, respectively. In various configurations, binary tree leaf nodes may point to B-tree leaf nodes, internal nodes, or a combination thereof, including internal nodes at different levels or the same level. As illustrated by the example B-tree 302, in one embodiment, each B-tree leaf node 308 is referenced by a binary tree leaf node or has an ancestor node that is referenced by a binary tree leaf node.

In one embodiment, for each of the B-tree nodes that is referenced by a binary tree, the binary tree includes only the first key from the B-tree node. Because of this, a top level auxiliary index may use considerably less cache or main memory than a hash table. Additionally, each left node entry or right node entry of a top level auxiliary index represents an interval of keys. For example, left node entry 718*a* of leaf node 708*b* may represent an interval of keys that are greater than or equal to the key of leaf node 708*b*'s parent node and less than the key of leaf node 708*b*. The B-tree node pointed to by left node entry 718*a* also represents this interval.

In a cache optimized binary tree, some leaf nodes may be empty, without an entry, or at least without an entry that is in use. Generally, the higher the level of the B-tree nodes pointed to by the binary tree leaf nodes, the more binary tree leaf nodes there are, and the more cache or main memory that is used by the cache optimized binary tree 702.

When a binary tree is created, there are a number of possible configurations that it may take. This may include a specification of one or more levels of B-tree nodes that are to be referenced. In one embodiment, a determination is made of the size of a binary tree, and the level of the B-tree target nodes may be selected based on this. A determination of the binary tree size may be based on the available cache, the available main memory or other factors. In one embodiment, the size or configuration of a binary tree may be changed at various times, based on available cache, available main memory, performance, or other factors. For example, if cache or main memory becomes insufficient, a binary tree may be reduced by one or more levels, with aux leaf nodes changed to point to higher levels of B-tree nodes. In one embodiment, if sufficient additional cache or main memory becomes available, a binary tree may be expanded by one or more levels, with aux leaf nodes changed to point to lower levels of B-tree nodes. In one embodiment, the level of nodes pointed to by an aux leaf may be based on an access frequency or an update frequency of the B-tree leaf nodes. It may be more desirable to point to a B-tree leaf node that is accessed frequently. However, if a B-tree leaf node is updated frequently, it may be more desirable to point to a parent or ancestor node that is updated less frequently.

In one embodiment, the keys of a binary tree are normalized using an order preserving normalization technique, to account for case-sensitivity, collation, whitespace, or other issues. In one embodiment, keys may be compressed into fixed length integer keys. This reduces memory usage and improves the use of caches. In one implementation, native integer comparison operations may be performed on the fixed length integer keys. This is generally faster than variable length byte comparisons.

In various implementations, any of a number of order-preserving compression techniques may be applied to key data. Unicode data may be compressed using Binary Ordered Compression for Unicode (BOCU). In one implementation, numeric data is encoded using a variable length scheme so that small numbers take less space than large numbers. Examples of other order-preserving compression techniques include Antoshenkov-Lomet-Murray (ALM) or Hu-Tucker.

Figure 8:
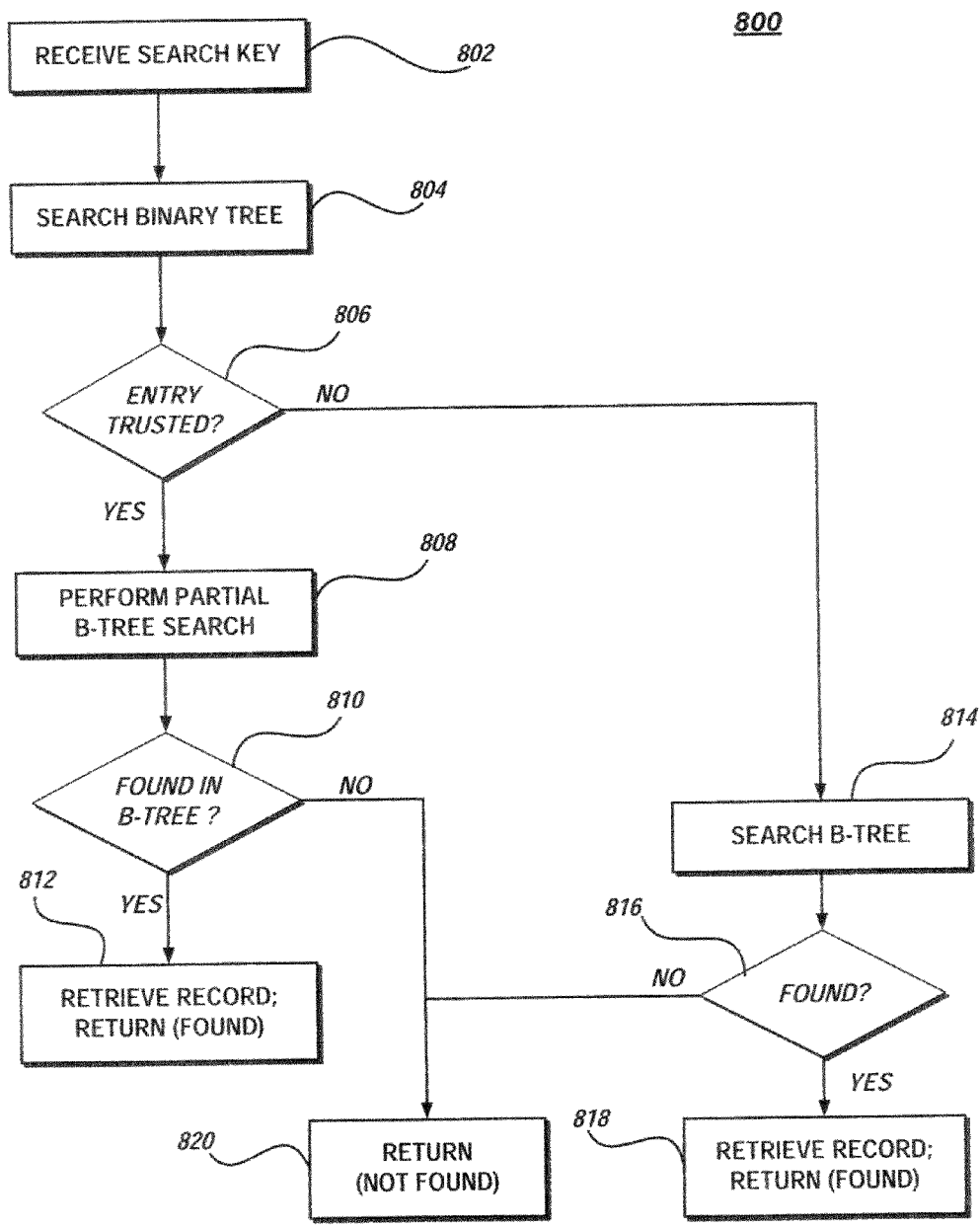
FIG. 8 is a flow diagram illustrating a process of searching for a B-tree record by using a top level auxiliary index system, in an example embodiment.

FIG. 8 is a flow diagram illustrating a process 800 of searching for a B-tree record by using a top level auxiliary index system, in an example embodiment. In one embodiment, the top level auxiliary index system may include a binary tree, such as cache optimized binary tree 702 of FIG. 7, though process 800 may be employed with other order preserving data structures. In one embodiment, at least a portion of the actions of process 800 are performed by auxiliary index manager 224.

The illustrated portions of process 800 may be initiated at block 802, where a search key is received. The process may flow to block 804, where the binary tree is searched to find an aux entry corresponding to an interval that includes the search key. In one embodiment, the B-tree node pointed to by this aux entry represents this interval. The process may flow from block 804 to decision block 806, where a determination is made of whether the aux entry is trusted.

As discussed with respect to block 506 (FIG. 5), an aux entry may be in an unstable state due to concurrent updates. The actions of block 806 may be the same or similar to those described for blocks 406 or 506. This may include determining the ownership of the B-tree node page and determining whether the aux LSN value matches the value of the referenced page. If, at decision block 806, it is determined that the aux entry is trusted, the process may flow to block 808, where the B-tree may be partially searched, beginning at the B-tree node referenced by the aux entry. In some configurations, this B-tree node may be an internal node. A partial search thus may begin at this node, reaching a B-tree leaf node and continuing from there. In some configurations, this B-tree node may be a B-tree leaf node. A partial search thus may begin at this node.

In various embodiments, searching a B-tree leaf node may include a sequential search, a binary search, or any other type of search. A B-tree key matching the search key may be found or not found in the B-tree leaf node.

In one embodiment, partially searching the B-tree beginning at a specified node may include, if a matching B-tree key is not found in a descendent node of the specified node, continuing the search at one or more sibling nodes to the right of the specified node or to the left of the specified node.

The process may flow to decision block 810, where a determination is made of whether a B-tree key matching the search key was found in the B-tree leaf node. If it is determined that the search key was found in the B-tree, the process may flow to block 812, where the record corresponding to the search key may be retrieved, and the process may return to a calling program with a status of "found."

If, at decision block 810, it is determined that the search key was not found in the B-tree, the process may flow to block 820, where the process may return to a calling program with a status of "not found."

Returning to decision block 806, if it is determined that the binary tree leaf node is not trusted, the process may flow to block 814, where a search of the B-tree may be performed. This search may begin at the B-tree root node. The process may flow to decision block 816, where a determination of whether the search key was found may be made. If the search key was found, the process may flow to block 818, where the record corresponding to the search key may be retrieved, and the process may return to a calling program with a status of "found." If, at decision block 816, it is determined that the search key was not found in the B-tree, the process may flow to block 820, where the process may return to a calling program with a status of "not found."

In one embodiment, a top level auxiliary index may be used to perform a range search. In a range search, a search specification may include two search keys, one of which is a lower bound and one that is an upper bound. The specification may also indicate whether the search range is inclusive or exclusive at each end. In one implementation of a range search, process 800 may be performed with the lower bound search key to find a first B-tree key and corresponding entry. However, if the lower bound search key is not found, the next higher key in the B-tree may be used as the first B-tree key. The process may then scan entries to the right of the first entry to find all keys that are within the specified range, based on the lower and upper bounds and whether the range is exclusive or inclusive at each end. If at least one B-tree entry within the specified range is found, the corresponding data records may be returned. If no entries are found within the specified range, the search may return a status of "not found."

As illustrated in FIG. 6, and discussed herein, a system may automatically retrieve metrics and make a determination of whether to use an auxiliary index, such as a top level auxiliary index. A determination of whether to use a top level auxiliary index may be based on any one or more of the factors described with respect to FIG. 6. These may include a number of read-only operations, a number of write operations, a number of positive searches, a number of negative searches, a frequency of changes to internal B-tree nodes, or other dynamic metrics. These may also include the database table size, an amount of available main memory, an amount of available cache, a depth of the B-tree, or other such metrics.

A top level auxiliary index may be adjusted in size to account for an amount of available cache or an amount of available main memory. Also, as described herein, a top level auxiliary index, even when it references B-tree leaf nodes, uses considerably less memory than a hash table that references individual keys of the B-tree. Therefore, a low cache or low memory environment may be a factor in determining to use a top level auxiliary index rather than another type of auxiliary index. Similarly, a top level auxiliary index may be preferred with a B-tree having a large table, in that it can be limited in the number of levels that are represented. Also, in environments in which there are frequent changes to the B-tree leaf nodes but top levels of the B-tree are infrequently split or merged, a top level auxiliary index may have an advantage over other types of auxiliary indices that are more affected by changes to the leaves. A top level auxiliary index may also be used for range searches. Therefore, the number of range searches that are made may be a factor in determining whether to use a top level auxiliary index. A process that makes an automatic determination of whether to use an auxiliary index or what type of auxiliary index to use may consider these factors.

In one embodiment, adjusting the size of a top level auxiliary index to reduce an amount of cache or an amount of main memory that is used may include modifying the top level auxiliary index by removing one or more aux nodes. A set of two or more aux page IDs that point to a corresponding set of BT nodes may be replaced by one aux page ID that points to one parent or ancestor node of the set of BT nodes.

It will be understood that each block of the flowchart illustrations of FIGS. 4, 5, 6, and 8, and combinations of blocks in the flowchart illustrations, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. In a data storage and retrieval system including a B-tree (BT) having a plurality of nodes, including internal nodes and leaf nodes, each leaf node including one or more BT keys, each BT key having a corresponding data record, a computer-based method of accessing data records comprising:
   a) creating an auxiliary index including a plurality of aux key values, each aux key value having a corresponding aux page identifier that points to a corresponding B-tree node;
   b) receiving a search key;
   c) employing the search key to search the auxiliary index to locate a matching aux key value and a corresponding aux page identifier;
   d) in response to finding the aux key value, determining whether the aux page identifier is trusted;
   e) if the aux page identifier is trusted, using the aux page identifier to retrieve a data record corresponding to the search key; and
   f) if the aux page identifier is not trusted, performing a search of the B-tree to retrieve the data record corresponding to the search key;
   wherein the B-tree is a tree data structure that maintains data in a sorted order; and
   wherein the method is performed by a computer processor.

2. The computer-based method of claim 1, each aux key value having a corresponding log sequence number corresponding to the leaf node identified by the corresponding aux page identifier, further comprising determining whether the aux page identifier is trusted based on the log sequence number.

3. The computer-based method of claim 1, further comprising determining whether the aux page identifier is trusted by employing the search key to perform a second search of the auxiliary index to locate the aux key value.

4. The computer-based method of claim 1, comprising: selectively discarding at least a portion of the auxiliary index based on at least one of an amount of available cache, an amount of main memory, a number of data records associated with the B-tree, or a ratio of positive searches to negative searches; and performing additional searches of the B-tree without employing the auxiliary index.

5. The computer-based method of claim 1, the auxiliary index including a hash table, each aux page identifier pointing to a corresponding B-tree leaf node, each aux key value having a corresponding slot identifier that points to a slot in the B-tree leaf node.

6. The computer-based method of claim 5, further comprising if the aux key value is not found, performing a search of the B-tree to retrieve a data record corresponding to the search key.

7. The computer-based method of claim 1, retrieving the data record corresponding to the search key comprising performing a partial search of the B-tree, beginning at a B-tree node pointed to by the aux page identifier.

8. The computer-based method of claim 1, further comprising retrieving the data record corresponding to the search key from the B-tree and scanning B-tree records to retrieve additional data records in a specified range.

9. The computer-based method of claim 1, the auxiliary index including a cache optimized binary tree structure, each aux key value equivalent to a lowest BT key value in the B-tree internal node or leaf node corresponding to the aux key value.

10. The computer-based method of claim 1, the auxiliary index pointing to a first set of B-tree nodes, further comprising selectively, based on at least one of an amount of available cache, an amount of available main memory, or a number of data records referenced by the B-tree, replacing a first set of at least two aux page identifiers that point to a corresponding set of B-tree nodes with one aux page identifier that points to one ancestor node of the set of B-tree nodes.

11. A computer-readable storage medium comprising computer program instructions executable by a computer processor for accessing data records in a B-tree (BT), the B-tree having a plurality of nodes, including internal nodes and leaf nodes, each leaf node including one or more BT keys, each BT key having a corresponding data record, the computer program instructions executable by the computer processor to perform actions including:
   a) creating a hash table with a plurality of entries, each entry including an aux key value, an aux page identifier that points to a corresponding B-tree leaf node, and an aux slot identifier that points to a corresponding slot in the corresponding B-tree leaf node;
   b) receiving a search key;
   c) searching the hash table for an entry with an aux key value that matches the search key;
   d) in response to finding the entry, performing additional actions including:
      i) determining whether a corresponding page identifier is trusted;
      ii) if the corresponding aux page identifier is trusted, using the corresponding aux page identifier and a corresponding aux slot identifier to retrieve a data record corresponding to the search key from the B-tree; and iii) if the corresponding aux page identifier is not trusted, performing a search of the B-tree to retrieve the data record corresponding to the search key and updating the entry;

wherein the B-tree is a tree data structure that maintains data in a sorted order.

12. The computer-readable storage medium of claim 11, the hash tree having fewer aux key values than B-tree leaf nodes, the actions further comprising not maintaining a one-to-one correspondence between the BT-keys and the aux key values.

13. The computer-readable storage medium of claim 11, the actions further comprising performing update actions, the update actions including maintaining a one-to-one correspondence between the BT keys and the aux key values.

14. The computer-readable storage medium of claim 13, the actions further comprising selectively modifying the update actions to not include maintaining the one-to-one correspondence between the BT keys and the aux key values, based on at least one of an amount of available cache, an amount of main memory, or a number of data records referenced by the B-tree.

15. The computer-readable storage medium of claim 11, the actions further comprising determining a type of auxiliary index to employ based on one or more metrics relating to an operation of the B-tree or one or more metrics of a system configuration, and automatically initiating a use of the determined type of auxiliary index.

16. A computer-based system for accessing data records of a B-tree (BT), the B-tree having a plurality of nodes, including internal nodes and leaf nodes, each leaf node including one or more keys, each key having a corresponding data record, the system comprising:

a) an auxiliary index that includes a plurality of entries, each entry having a corresponding aux key value and a corresponding aux node pointer that points to a corresponding internal node or a leaf node of the B-tree;

b) an auxiliary index manager comprising computer program instructions for searching the auxiliary index for an entry having a corresponding aux key value matching a search key;

c) trust determination means for determining whether the entry having the corresponding aux key value is trusted;

d) means for, if the entry is trusted, using the auxiliary index to retrieve a data record corresponding to the search key;

e) means for, if the entry is not trusted, searching the B-tree to retrieve the data record corresponding to the search key; and f) means for selectively performing searches of the B-tree after modifying the auxiliary index to reduce an amount of cache or an amount of main memory used by the auxiliary index;

wherein the B-tree is a tree data structure that maintains data in a sorted order; and wherein each of the means comprises at least one computer processor.

17. The computer-based system of claim 16, the trust determination means comprising means for performing an additional search of the auxiliary index for the entry having the corresponding aux key value.

18. The computer-based system of claim 16, further comprising means for automatically determining whether to employ a lazy hash table or a definitive hash table as the auxiliary index and automatically creating the determined auxiliary index.

* * * * *